(12) United States Patent
Senarath et al.

(10) Patent No.: US 10,892,949 B2
(45) Date of Patent: Jan. 12, 2021

(54) METHOD AND APPARATUS TO USE INFRA-STRUCTURE OR NETWORK CONNECTIVITY SERVICES PROVIDED BY 3RD PARTIES

(71) Applicants:Nimal Gamini Senarath, Ottawa (CA); Sophie Vrzic, Kanata (CA); Jaya Rao, Ottawa (CA)

(72) Inventors: Nimal Gamini Senarath, Ottawa (CA); Sophie Vrzic, Kanata (CA); Jaya Rao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/242,244

(22) Filed: Jan. 8, 2019

(65) Prior Publication Data

US 2019/0141532 A1     May 9, 2019

Related U.S. Application Data

(63) Continuation of application No. 15/169,465, filed on May 31, 2016, now Pat. No. 10,212,589.

(Continued)

(51) Int. Cl.
    *H04M 1/66*          (2006.01)
    *H04L 12/24*        (2006.01)
    (Continued)

(52) U.S. Cl.
    CPC ........ *H04L 41/0896* (2013.01); *H04M 15/51* (2013.01); *H04M 15/88* (2013.01);
    (Continued)

(58) Field of Classification Search
    CPC ......... H04W 48/18; H04W 8/20; H04W 4/24; H04W 24/02; H04W 88/18; H04M 15/88;
    (Continued)

(56) References Cited

U.S. PATENT DOCUMENTS 6,842,783 B1    1/2005   Boivie et al.
7,925,756 B1    4/2011   Riddle
                (Continued)

FOREIGN PATENT DOCUMENTS

CA         2874463 C     5/2019
CN      101166181 A     4/2008
            (Continued)

OTHER PUBLICATIONS

International Search Report for International Application No. PCT/CA2016/084398 dated Aug. 12, 2016.

(Continued)

*Primary Examiner* — Charles T Shedrick

(57) ABSTRACT

A telecom connectivity service provider (TCSP) and a method for allocating an infrastructure resource to a virtual network operator (VNO). A TCSP control element sends to a downstream control element, a request for a portion of the infrastructure to be allocated to the TCSP by an infrastructure provider (InP) and receives a response from the downstream control element providing access to and control of the allocated infrastructure. The TCSP control element can pool the allocated infrastructure with other resources allocated to the TCSP and/or communicate with an upstream control element for providing access to and control of the allocated infrastructure to the VNO. The downstream control element is a local InP control element or a downstream TCSP control element. The upstream control element is a VNO control element or an upstream TCSP control element.

27 Claims, 15 Drawing Sheets

Related U.S. Application Data

(60) Provisional application No. 62/170,051, filed on Jun. 2, 2015.

(51) Int. Cl.
*H04W 48/18* (2009.01)
*H04W 8/20* (2009.01)
*H04M 15/00* (2006.01)
*H04W 24/02* (2009.01)
*H04W 4/24* (2018.01)
*H04W 12/06* (2009.01)
*H04W 88/18* (2009.01)

(52) U.S. Cl.
CPC .............. *H04W 4/24* (2013.01); *H04W 8/20* (2013.01); *H04W 12/0608* (2019.01); *H04W 24/02* (2013.01); *H04W 48/18* (2013.01); *H04L 41/5054* (2013.01); *H04W 88/18* (2013.01)

(58) Field of Classification Search
CPC . H04M 15/51; H04L 41/5054; H04L 41/0896
USPC .......................................................... 455/411
See application file for complete search history.

(56) References Cited

U.S. PATENT DOCUMENTS

| | | |
|---|---|---|
| 9,392,471 B1 | 7/2016 | Thomas et al. |
| 10,039,112 B2 | 7/2018 | Senarath et al. |
| 10,129,894 B2 | 11/2018 | Farmanbar et al. |
| 2003/0103510 A1 | 6/2003 | Svanberg et al. |
| 2003/0117954 A1 | 6/2003 | De Neve et al. |
| 2003/0177221 A1 | 9/2003 | Ould-Brahim et al. |
| 2004/0146036 A1 | 7/2004 | Parantainen et al. |
| 2004/0203973 A1 | 10/2004 | Khan |
| 2006/0085544 A1 | 4/2006 | Chen et al. |
| 2007/0297367 A1 | 12/2007 | Wang et al. |
| 2008/0130519 A1 | 6/2008 | Bahl et al. |
| 2009/0191888 A1 | 7/2009 | Abedi |
| 2010/0046531 A1* | 2/2010 | Louati .................. H04L 45/586 370/401 |
| 2010/0069081 A1 | 3/2010 | Mitra et al. |
| 2010/0122141 A1 | 5/2010 | Arye |
| 2010/0216404 A1 | 8/2010 | Hershey et al. |
| 2010/0242092 A1* | 9/2010 | Harris .................... G06F 21/53 726/3 |
| 2011/0125905 A1* | 5/2011 | Baucke ............ H04M 15/8044 709/226 |
| 2011/0283017 A1 | 11/2011 | Alkhatib et al. |
| 2012/0120887 A1 | 5/2012 | Deaton et al. |
| 2012/0233302 A1 | 9/2012 | Kallin et al. |
| 2013/0007232 A1 | 1/2013 | Wang et al. |
| 2013/0143574 A1 | 6/2013 | Teyeb et al. |
| 2013/0159376 A1* | 6/2013 | Moore ................... H04L 67/10 709/202 |
| 2013/0182601 A1 | 7/2013 | Bandyopadhyay et al. |
| 2013/0183991 A1 | 7/2013 | Bosch et al. |
| 2013/0201847 A1 | 8/2013 | Chincholi et al. |
| 2013/0212285 A1 | 8/2013 | Hoffmann et al. |
| 2013/0225123 A1* | 8/2013 | Adjakple ............ G06Q 20/027 455/406 |
| 2013/0295946 A1 | 11/2013 | Panchal et al. |
| 2013/0303114 A1 | 11/2013 | Ahmad et al. |
| 2014/0086177 A1 | 3/2014 | Adjakple et al. |
| 2014/0086194 A1 | 3/2014 | Sugahara |
| 2014/0115578 A1* | 4/2014 | Cooper .............. H04L 63/1416 718/1 |
| 2014/0119218 A1 | 5/2014 | Hsu |
| 2014/0200036 A1 | 7/2014 | Egner et al. |
| 2014/0215466 A1* | 7/2014 | Khasnabish ........ G06F 9/45558 718/1 |
| 2014/0244808 A1 | 8/2014 | Axelrod et al. |
| 2014/0269295 A1 | 9/2014 | Anumala |
| 2014/0282769 A1 | 9/2014 | Salem et al. |
| 2014/0301192 A1 | 10/2014 | Lee et al. |
| 2014/0317261 A1 | 10/2014 | Shatzkamer et al. |
| 2014/0376555 A1 | 12/2014 | Choi et al. |
| 2015/0011234 A1 | 1/2015 | Wei et al. |
| 2015/0043382 A1 | 2/2015 | Arora et al. |
| 2015/0063112 A1 | 3/2015 | Wu et al. |
| 2015/0100694 A1 | 4/2015 | Sohail |
| 2015/0104172 A1 | 4/2015 | Wang et al. |
| 2015/0109995 A1 | 4/2015 | Mathai et al. |
| 2015/0154258 A1 | 6/2015 | Xiong et al. |
| 2015/0173111 A1* | 6/2015 | Agarwal ............ H04L 63/0884 370/329 |
| 2015/0236948 A1 | 8/2015 | Dunbar et al. |
| 2015/0288541 A1* | 10/2015 | Fargano .................. H04L 43/08 709/225 |
| 2015/0341907 A1 | 11/2015 | Zhang et al. |
| 2015/0351118 A1 | 12/2015 | Arnott et al. |
| 2016/0044702 A1 | 2/2016 | Centonza et al. |
| 2016/0328259 A1* | 11/2016 | Xia ..................... G06F 9/45558 |
| 2016/0035968 A1 | 12/2016 | Senarath et al. |
| 2016/0352528 A1 | 12/2016 | Law et al. |
| 2016/0353465 A1 | 12/2016 | Vrzic et al. |
| 2017/0064031 A1 | 3/2017 | Sunay |
| 2017/0079059 A1 | 3/2017 | Li et al. |
| 2017/0104609 A1 | 4/2017 | McNamee et al. |
| 2017/0126492 A1 | 5/2017 | Law et al. |
| 2017/0127427 A1 | 5/2017 | Claridge et al. |
| 2017/0208019 A1* | 7/2017 | Shimojou ........... H04L 41/0896 |
| 2017/0257870 A1 | 9/2017 | Farmanbar |
| 2017/0311304 A1 | 10/2017 | Lu |
| 2017/0346752 A1 | 11/2017 | Krishnamurthy et al. |
| 2018/0026794 A1* | 1/2018 | Nakano ................... H04L 63/10 713/176 |
| 2018/0048523 A1* | 2/2018 | Nakano ................... H04L 12/46 |

FOREIGN PATENT DOCUMENTS

| | | |
|---|---|---|
| CN | 102427473 A | 4/2012 |
| CN | 102710508 A | 10/2012 |
| CN | 103052054 A | 4/2013 |
| CN | 103168445 A | 6/2013 |
| CN | 103369535 A | 10/2013 |
| CN | 103548370 A | 1/2014 |
| CN | 104243301 A | 12/2014 |
| CN | 104252390 A | 12/2014 |
| CN | 104270441 A | 1/2015 |
| CN | 104335639 A | 2/2015 |
| EP | 1729532 A1 | 12/2006 |
| EP | 2493235 A1 | 8/2012 |
| EP | 2627140 A1 | 8/2013 |
| EP | 2667541 A1 | 11/2013 |
| EP | 2866495 A2 | 4/2015 |
| GB | 2512900 A | 10/2014 |
| JP | 2009542091 A | 11/2009 |
| JP | 2011508474 A | 3/2011 |
| JP | 2013541289 A | 11/2013 |
| JP | 2014045390 A | 3/2014 |
| JP | 2014090501 A | 5/2014 |
| JP | 2015080204 A | 4/2015 |
| KR | 20130084680 A | 7/2013 |
| WO | 2009071431 A1 | 6/2009 |
| WO | 2011032595 A1 | 3/2011 |
| WO | 2011086250 A1 | 7/2011 |
| WO | 2011144538 A1 | 11/2011 |
| WO | 2012055448 A1 | 5/2012 |
| WO | 2013093462 A1 | 6/2013 |
| WO | 2013170045 A2 | 11/2013 |
| WO | 2014086978 A1 | 6/2014 |
| WO | 2014090997 A1 | 6/2014 |
| WO | 2014117135 A2 | 7/2014 |
| WO | 2014121471 A1 | 8/2014 |
| WO | 2014160228 A1 | 10/2014 |
| WO | 2014180513 A1 | 11/2014 |
| WO | 2014194753 A1 | 12/2014 |
| WO | 2014197778 A1 | 12/2014 |

(56) References Cited

FOREIGN PATENT DOCUMENTS

| WO | 2015031512 A1 | 3/2015 |
|---|---|---|
| WO | 2015057960 A1 | 4/2015 |

OTHER PUBLICATIONS

International Search Report for International Application No. PCT/CN2016/084396 dated Aug. 23, 2016.
3GPP TR 22.891 titled Study on New Services and Market Technology Enablers, Sep. 2016.
ETSI GS NFV 001 titled "Network Function Virtualization (NFV); Use Cases", Oct. 2013.
ETSI GS NFV 002 titled "Network Function Virtualization (NFV); Architectural Framework", Oct. 2013.
International Search Report dated Aug. 8, 2016 for corresponding International Application No. PCT/CN2016/084399 filed Jun. 1, 2016.
International Search Report dated Aug. 4, 2016 for corresponding International Application No. PCT/CN2016/084401 filed Jun. 1, 2016.
International Search Report dated Jul. 18, 2016 for corresponding International Application No. PCT/CN2016/084405 filed Jun. 1, 2016.
International Search Report dated Nov. 14, 2016 for corresponding International Application No. PCT/CN2016/099726 filed Sep. 22, 2016.
3GPP TR 23.707 V13.0.0 titled Technical Specification Group Services and System Aspects; Architecture Enhancements for Dedicated Core Networks: Stage 2, Dec. 2014.
NGMN 5G Initiative White Paper, A Deliverable by the NGMN Alliance, pp. 1-125, Feb. 17, 2015.
3GPP TR 22.891 V0.1.0 (Aug. 2015),3rd Generation Partnership Project;Technical Specification Group Services and System Aspects; Feasibility Study on New Services and Markets Technology Enablers; Stage 1 (Release 14), total 26 pages.
European Search Report dated Nov. 22, 2017 for corresponding European Application No. 16802559.1 filed Jun. 1, 2016.
Extended European Search Report dated Mar. 1, 2018 for corresponding European Patent Application No. 16802560.9 filed Jun. 1, 2016.
Hamid Farmanbar et al.,"Traffic Engineering for Software-Defined Radio Access Networks", 2014 IEEE Network Operations and Management Symposium, May 5, 2014.
Extended European Search Report dated Feb. 27, 2018 for corresponding European Application No. 16802562.5 filed Jan. 6, 2016.
Extended European Search Report dated Mar. 20, 2018 for corresponding European Application No. 16802556.7 filed Mar. 27, 2018.
Partial Supplementary European Search Report dated Apr. 19, 2018 for corresponding European Application No. 16802558.3 filed Jun. 1, 2016.
Liang et al., "Wireless Virtualization for Next Generation Mobile Cellular Networks", IEEE Wireless Communications, pp. 61-69, Feb. 1, 2015.
Liang et al., "Wireless Network Virtualization: A Survey, Some Research Issues and Challenges", IEEE Communications Surveys & Tutorials, vol. 17(1), Jan. 1, 2015.
Takuya Shimojyo, et al., Future Mobile Core Network for Efficient Service Operation, Network Softwarization, 2015 1st IEEE Conference on, Apr. 2015.
Tsuyoshi Ogura et al.,"A Study on Congestion Avoidance Technology using Multiple Virtual Networks", IEICE technical report, vol. 114 No. 28, May 8, 2014.
Akihiro Nakao,"Virtualization Technology for Building New-Generation Networks",Virtual Node Project,NICT News,20100630,total 12 pages.
ETSI GS NFV 002 V1.2.1 (Dec. 2014),Network Functions Virtualisation (NFV);Architectural Framework,total 21 pages.

\* cited by examiner

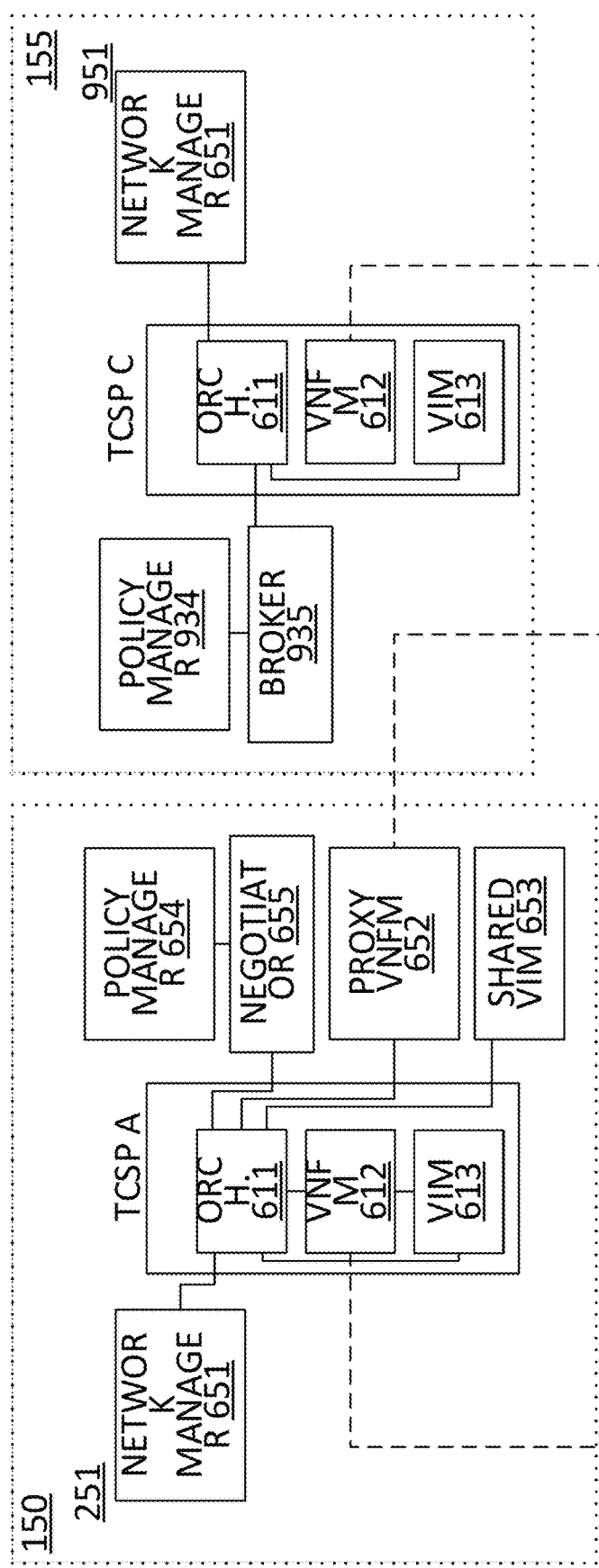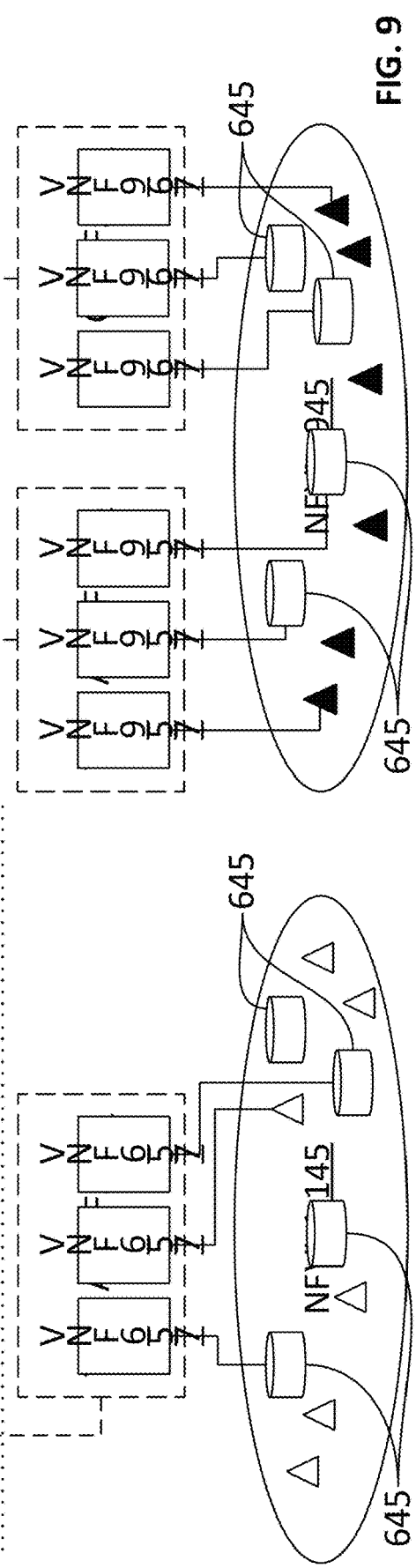
FIG. 9

METHOD AND APPARATUS TO USE INFRA-STRUCTURE OR NETWORK CONNECTIVITY SERVICES PROVIDED BY 3RD PARTIES

CROSS REFERENCE TO RELATED APPLICATIONS

This application claims the benefit of priority to U.S. Patent Application Ser. No. 62/170,051, filed Jun. 2, 2015, and is a continuation of U.S. patent application Ser. No. 15/169,465 filed on May 31, 2016, the contents of which are incorporated herein by reference.

TECHNICAL FIELD

The present disclosure relates to wireless access networks and in particular to methods of managing and virtualizing a network to provide third-party infrastructure among service providers.

BACKGROUND

Currently, Mobile Virtual Network Operators (MVNOs) provide services to their subscribers using services and infrastructure provided by mobile network operators (MNOs). The relationship between an MVNO and a MNO is typically defined by Service Level Agreements (SLAs). An MVNO typically arranges for access to a set of resources from at least one MNO. The MVNO may operate its own servers for the purposes of authentication, accounting, and other administrative tasks, but it relies upon an MNO for access to infrastructure and a wireless interface. Some MVNOs use the resources of a plurality of different MNOs to obtain broader coverage when the coverage areas of the MNOs do not strictly overlap or to allow for better service if the coverage areas of the MNOs overlap. Currently, an MVNO typically operates through a bulk purchase of resources (e.g. bulk purchases of voice call minutes, or bulk purchases of data) that are then resold to end customers.

There are various proposals and standards preparations (such as Network Functions Virtualization (NFV) MANagement and Orchestration architectural framework (MANO), collectively NFV-MANO) to facilitate the development of network architectures in such models, a customer-facing service provider, known as a virtual network operator (VNO) operates a virtual network (VN) to provide service to its customers (and end users). The VNs make use of virtualized infrastructure (enabled by NFV infrastructure (NFVI)) and a variety of functions that can be provided in a virtualized environment. Using management and instantiation techniques across a number of different infrastructure and service providers can allow for interoperability of different virtual service providers.

Methods and systems that allow the management and control of such virtual network architectures would be desired.

BRIEF DESCRIPTION OF THE DRAWINGS

Examples of the present disclosure will now be described by reference to the following figures, in which identical reference numerals in different figures indicate identical elements and in which:

FIG. 9 is a block diagram illustrating example components of TCSPs suitable for providing an IaaS capability from one TCSP to another TCSP in the scenario of FIG. 8;

SUMMARY

Figure 1:
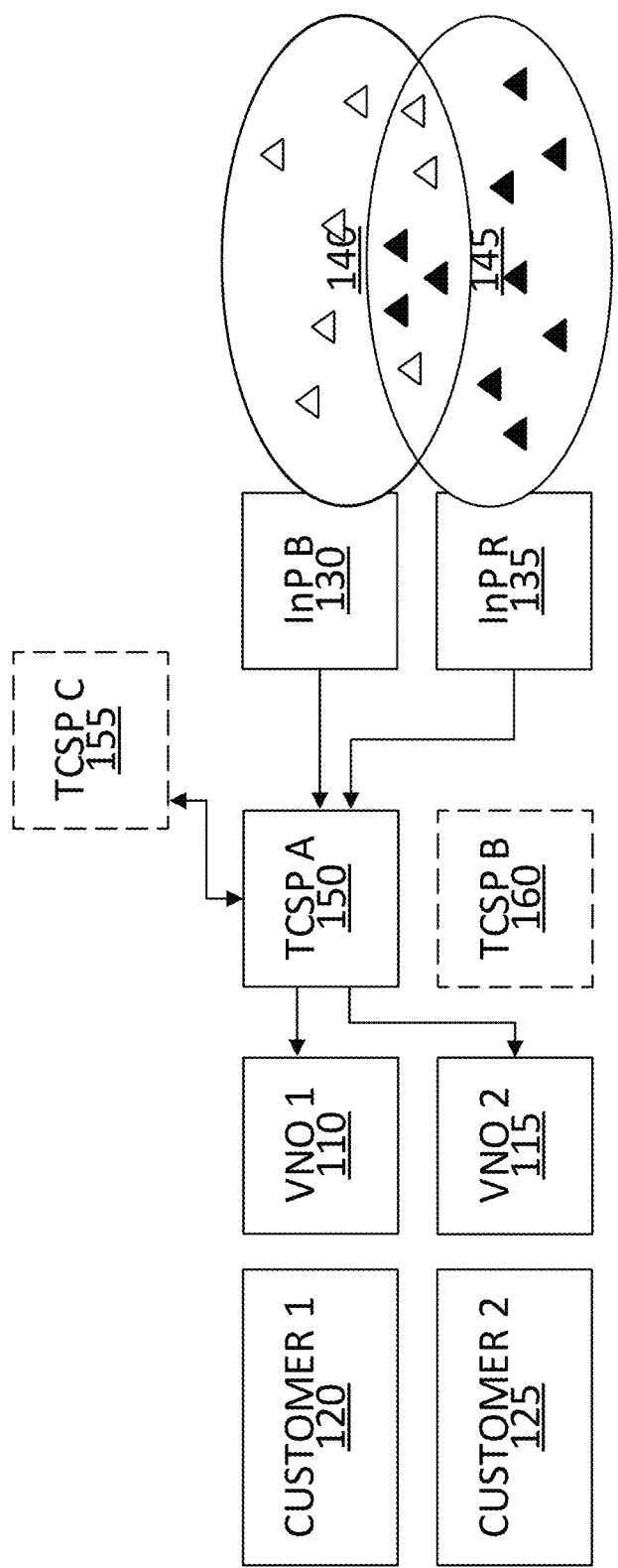
FIG. 1 is a block diagram of an example configuration of a network architecture.

In next generation networks, such as so-called fifth generation (5G) networks, there will be infrastructure-owning entities or infrastructure providers (InPs) that do not provide telecommunications services on their deployed infrastructure. To allow for different entities to make use of this infrastructure, it is expected that virtualization of network resources and network functions will be employed.

The present disclosure discloses a method for negotiating control and accessing third party InP infrastructure using virtualization of the infrastructure in a manner that is transparent to already embedded virtual networks and end users.

In the architecture discussed below, three different entities participate in the delivery of service to mobile devices. An InP provides infrastructure that can be used by a number of different parties. In many embodiments, the InP provides Radio Access Network (RAN) resources. The core network functionality can be provided by a Telecommunications Connectivity Service Provider (TCSP), which may also be referred to as a Service Provider (SP). The TCSP can engage a plurality of InPs so that it can offer connectivity in different areas. The TCSP may own physical RAN resources as well. If these resources are available to other TCSPs, then the RAN resources can be organized as an InP. A Virtual Network Operator (VNO) provides user or customer facing services. The VNO can be distinct from the TCSP, allowing a large number of service providers to be supported. The separation of these roles allows for different parties to provide service with a reduced startup cost. Entities such as property managers can become InPs by connecting pico-cell type Access Points (APs), without needing to worry about how to provide network services atop the infrastructure. A TCSP does not need to build all the infrastructure required for a Radio Access Network, and can even avoid having to deal with end users.

There may be VNOs that will enter into customer agreements to provide network services to a customer's end users, but do not own all or any of the infrastructure that would be used to provide such capability to its customers and end users.

By making infrastructure available to TCSP(s), an InP can make its infrastructure available to any VNO associated with the TCSP(s). The InP can allocate its infrastructure to the TCSP in any of a number of different ways including hard allocation of portions of the infrastructure (in time and/or frequency allocations), or through the use of virtualization. The TCSP can be allocated a virtualized set of resources that the InP can map to the physical infrastructure. Similarly, the TCSP can make virtualized resources available to a VNO, allowing the VNO to make use of some or all of the resources allocated to the TCSP.

In one example, infrastructure of multiple InPs could be used by a single TCSP. In one example, multiple TCSPs could use the infrastructure of a single InP.

When an InP allocates or provides infrastructure to a TCSP, the infrastructure may be allocated with varying degrees of control. In one example, the control capability may include power control and/or scheduling functions.

When an InP allocates its infrastructure to a plurality of TCSPs, mechanisms are provided to allow different levels of control to different TCSPs. In one example, the InP may allocate infrastructure for exclusive use by an individual TCSP (designated a "hard slice"). When an InP allocates a hard slice of the infrastructure to a TCSP, it may also cede some degree of control capability to the TCSP.

In one example, the InP's allocation of infrastructure for use by an individual TCSP may not be as strictly identified as it is in the hard slicing example. Such allocations also referred to as a "soft slice", allow access to an InP's infrastructure without a strictly-defined boundary on the allocated resources. In one example, instead of allocating certain time or frequency allocations to a TCSP, an InP may simply indicate that a certain percentage of its infrastructure will be available to the TCSP within an agreed-upon time window (e.g. 40% of the resource blocks within a 5 second time window). Such guarantees provide the TCSP with access to the InP's infrastructure but without strictly defining the terms of such access, including without limitation, the time and/or frequency allotment. Because the allocation is not strictly defined, the TCSP is not provided with fine-grained control over the infrastructure. Rather, the InP maintains some control over the infrastructure but takes instructions and guidelines for their control from the TCSP in accordance with the terms of such guarantee.

In one example, an InP could provide physical layer abstractions of certain infrastructure and their capabilities to the TCSPs for the TCSPs to access and use. In one example, the associated costs of providing such abstractions could be allocated in a dynamic or static manner.

In one example, a first TCSP could be interposed between a second TCSP and an InP. In such example, the first TCSP could act as a virtual InP from the perspective of the second TCSP. In such example, the second TCSP could act as a virtual VNO from the perspective of the first TCSP.

Thus, a TCSP control element of a TCSP may be in communication with a downstream control element. The downstream element could be a local control element in an InP. Alternatively, the downstream element could be a TCSP control element of a downstream TCSP. The TCSP control element uses such communications to request and/or receive access and/or control of an allocation of the infrastructure.

Further, the TCSP control element of a TCSP may be in communication with an upstream control element. The upstream control element could be a TCSP control element of an upstream TCSP or a VN control element of a VNO. The TCSP control element uses such communications to provide the VNO with access to and/or control of at least one VNF instantiated using the allocated infrastructure.

The TCSP control element, local control element of the InP and/or the VN control element of the VNO may govern aspects of the infrastructure resources, such as resource control (RC), authentication, authorization and accounting (AAA), access control (AC) and/or performance monitoring.

According to an example, there is disclosed a method for allocating at least one infrastructure resource to at least one VNO. The method comprises actions, at a TCSP control element of at least one TCSP, of sending to a downstream control element, a request for a portion of the infrastructure to be allocated to the TCSP by an InP associated with the infrastructure, receiving a response from the downstream control element providing access to and control of the allocated infrastructure to the TCSP, and accessing and controlling the allocated infrastructure.

The action of accessing and controlling can comprise pooling the allocated infrastructure with other infrastructure allocated to the TCSP.

The method can comprise communicating with an upstream control element for providing access to and control of the allocated infrastructure to the VNO.

The upstream control element can be the TCSP control element of an upstream TCSP and/or a VN control element of the VNO in communication with the TCSP control element of a TCSP. The downstream control element can be the TCSP control element of a downstream TCSP and/or a local control element of the InP in communication with the TCSP control element of a TCSP.

The TCSP control element and the downstream control element can exchange requests and responses until a resource usage policy is agreed to before the TCSP processes and controls the allocated infrastructure. The resource usage policy can govern an RC, AAA and/or AC attribute and/or performance monitoring.

The allocated infrastructure can be a hard slice of resources providing the TCSP with exclusive use of the infrastructure in the slice and/or a soft slice of resource providing the TCSP with an upper limit on use of the infrastructure in the slice.

According to an example, there is disclosed a TCSP for accessing and controlling a portion of at least one infrastructure resource allocated to the TCSP by an InP associated with the infrastructure. The TCSP comprises a TCSP control element for sending a request to a downstream control element of the InP to allocate the infrastructure to the TCSP and for receiving a response from the downstream control element providing access to and control of the allocated infrastructure to the TCSP, whereby the TCSP accesses and controls the allocated infrastructure.

The TCSP control element can be the downstream control element for receiving the request from the TCSP control element of an upstream TCSP and for sending the response to the TCSP control element of the upstream TCSP. The TCSP control element can comprise a broker entity for negotiating a resource usage policy with the TCSP control element of the upstream TCSP.

The TCSP control element can exercise control under direction of the TCSP control element of the upstream TCSP and/or cede control to the TCSP control element of the upstream TCSP.

The TCSP can pool the allocated infrastructure with other resources allocated to the TCSP and/or communicate with an upstream control element for providing access to and control of the allocated infrastructure to at least one VNO.

The TCSP control element can be the upstream control element for communication with the TCSP control element of a downstream TCSP.

The TCSP can comprise a MANO in communication with the TCSP control element. The MANO can comprise an orchestrator, a VNF manager and/or a VIM.

The TCSP control element can comprise a network manager, a proxy VNFM, a shared VIM, a policy manager and/or a negotiator. The negotiator can negotiate a resource usage policy with the downstream control element. The policy manager can identify the acceptable resource usage policy. The negotiator can be controlled by the orchestrator. The shared VIM can control the allocated infrastructure.

In accordance with an aspect, there is provided a telecom connectivity service provider (TCSP) control element comprising: a network interface, a processor and a non-transitory memory. The network interface allows for communication with control elements within an Infrastructure provider (InP). The non-transitory memory stores instructions that when executed by the processor cause the TCSP control element to send to an Infrastructure Provider (InP) control element, a request for a portion of the infrastructure to be allocated to the TCSP; and access an allocated portion of the resources of the InP associated with the InP control element in response to receiving a response from the InP control element providing access to the allocated infrastructure.

In an embodiment, the memory contains further instructions to transmit control instructions to infrastructure associated with the allocated portion of the resources in response to receipt of control of the allocated portion of the resources.

In another aspect, there is provided a method of supporting third party authentication of a roaming user equipment (UE) at a mobility management function. The method comprises receiving an attach request associated with a UE; determining that the UE associated with the attach request cannot be authenticated using local resources; transmitting an authentication request to a second mobility management function to obtain authentication of the UE; receiving from the second mobility management function a third party authentication associated with the UE.

In embodiments, The method further includes receiving a handover request from the second mobility management function in advance of receipt of the attach request. In another embodiment, the received third party authentication is an authentication of a user.

DESCRIPTION

When a VNO receives a request to admit a new customer, or to provide additional services to an existing customer, the VNO will determine whether it has sufficient resources to provide the (additional) services to the customer. If it does not have sufficient resources, it may try to obtain access to additional resources by requesting services from a TCSP.

When a TCSP receives a request from a VNO to obtain services or resources from the TCSP, the TCSP will determine whether it has sufficient resources to provide such services to the VNO. If it does not have sufficient resources, it may try to obtain access to additional resources by which it can support the VNO's request. This may involve attempting to obtain additional resources from an InP with whom it already has obtained resources or to establish a relationship with one or more InPs with which it does not currently obtain resources. The TCSP can determine whether an InP has resource capability that the TCSP can access to support the VNO, if the TCSP has visibility into the resource control (RC) and/or access control (AC) for the InP's infrastructure resource set(s). Mechanisms disclosed below provide the TCSP with visibility into the resource availability of an InP and a variety of solutions for providing such visibility to an MVNO that it may otherwise lack.

FIG. 1 is a block diagram illustrating an example relationship between different network entities. The diagram identifies VNO 1 110 and VNO 2 115. Each VNO 110, 115 has its own end user population, each collectively designated respectively as Customer 1 120 and Customer 2 125.

In some examples, a VNO 110, 115 may have an end-user population 120, 125 that is distinguishable, for example, by geography or by type of service. Non-limiting examples of the type of service may include an alarm company or utility that operates machine-type communications (MTC) sensors, emergency (police, fire, paramedic) first responder services, and/or a video distribution service. Each such example service may have an end-user population 120, 125 that has specific characteristics. A VNO 110, 115 may cater to an end-user population 120, 125 that has such specific characteristics.

Alternatively, a VNO 110, 115 may simply offer services of a generic nature to any customer that chooses to subscribe to its services. In such example, the nature of the customer or end-user population 120, 125 being serviced by a VNO 110, 115 may dictate to what resources the VNO 110, 115 may choose to subscribe and the manner in which it effects such subscription.

The diagram also shows InP B 130 and InP R 135. There is not necessarily a one-to-one correspondence between InPs 130, 135 and VNOs 110, 115. Any number of both InPs and VNOs can be supported.

Each of the InPs 130, 135 has one or more associated infrastructure resource sets and/or infrastructure services (collectively "infrastructure") 140, 145. In the example shown in FIG. 1, two sets are shown, each associated with a different InP 130, 135. The infrastructure 140, 145 or a portion allocated by the associated InP 130, 135, may, alone or in combination with other infrastructure 140, 145, be used to instantiate one or more VNFs (not shown) that may be used to serve the mobile devices (not shown) of end-users of one or more of the VNOs 110, 115. In this context, a mobile device (not shown) refers to a device that connects to the mobile network, whether or not the device is mobile or not.

The infrastructure 140, 145 offered by an InP 130, 135 may be of various types, including without limitation, one or more AP(s) (as shown), which may be base-stations or eNodeBs (eNBs), backhaul connections, processing and storage capacity and other resources that will be apparent to those skilled in the art. Such infrastructure may be permanently available in its entirety for use by one or more VNOs 110, 115. Alternatively, something less than the entirety of the infrastructure 140, 145 may be allocated or made available. Non-limiting examples include allocating only a portion of the infrastructure 140, 145, such as a certain frequency band, a certain bandwidth of an available connection and/or a given geographical area and/or making infrastructure 140, 145 available only during date- or time-specific windows.

In one example, the InPs 130, 135 provide their associated infrastructure 140, 145 and their controlling technology with one or more physical abstractions. In one non-limiting example, such abstractions may comprise a designation of dynamic or static allocation, and/or a so-called "hard" or "soft" slice, as described herein.

One or more TCSPs, respectively designated TCSP A 150, TCSP B 160 and TCSP C 155 are shown, are interposed between the VNOs 110, 115 and the InPs 130, 135. The TCSPs 150, 160 may each service a plurality of VNOs 110, 115 and a plurality of InPs 130, 135. Each TCSP 150, 155, 160 may be allocated a portion of infrastructure 140, 145 offered by one or more InPs 130, 135. Each TCSP 150, 155, 160 may pool its allocated infrastructure 140, 145 from different InPs 130, 135. A TCSP 150, 155, 160 may offer network service (including access to an allocation of the pooled infrastructure 140, 145) to the VNOs 110, 115. One or more VNOs 110, 115 may instantiate one or more VNFs (not shown) using the (pooled) allocated infrastructure 140, 145 offered by the TCSP 150, 155, 160.

From the perspective of the VNO 110, 115, the infrastructure 140, 145 on which the VNO 110, 115 has instantiated the VNFs (not shown) is assigned to TCSP 150, 155, 160. Thus, the VNO 110, 115 is effectively unaware of the existence of the InP 130, 135 to which the infrastructure 140, 145 actually belongs.

Likewise, from the perspective of the InP 130, 135, the customer/end-user population 120, 125 subscribes to the TCSP 150, 155, 160. Thus the InP 130, 135 is effectively unaware of the existence of the VNO 110, 115 to which the end-user population 120, 125 actually is subscribed.

A TCSP 150, 155, 160 can access an allocation of infrastructure 140 owned by InP B 130, under a prescribed set of conditions, and can access an allocation of infrastructure 145 owned by InP R 135 in accordance with another set of conditions. As noted above, such allocation by an InP 130, 135 may comprise a network slice that provides access to a set of NFVI mapping to the physical infrastructure 140 145. Subject to such conditions, the TCSP 150, 155, 160 is free to access and control its allocated infrastructure 140, 145, either alone or in combination with other infrastructure 140, 145. The TCSP 150, 155, 160 may provide access to the allocated infrastructure 140, 145 to subscribing VNOs 110, 115, by which the VNOs 110, 115 may provide service to its customers and end-users 120, 125.

The TCSPs 150, 155, 160 have neither end users 120, 125 nor infrastructure 140, 145 but model to the VNOs 110, 115 (or to other TCSPs 150, 155, 160, as discussed below) that they have infrastructure 140, 145 allocated to them.

In some example use cases, certain entities, such as a network operator, will have both customers/end users 120, 125 and own infrastructure 140, 145. That is, such entities may conduct operations that cover more than one of the strata corresponding to the VNO 110, 115, the InP 130, 135 and the TCSP 150, 155, 160. Such entities may thus be considered to comprise multiple separate virtual entities, each corresponding to one and only one of these strata.

It is conceivable that one of such virtual entities, such as the virtual TCSP entity, may interact with an entity other than the corresponding virtual entity of the same network operator. For example, the virtual TCSP entity may seek to have allocated infrastructure 140, 145 to it from an InP 150, 155, 160 other than the virtual InP entity of the same network operator, or the virtual InP entity may allocate its instructure 140, 145 to a TCSP 150, 155, 160 other than the virtual TCSP entity.

It is expected that going forward, there may increasingly arise entities that correspond to one only of these strata.

Figure 2A:
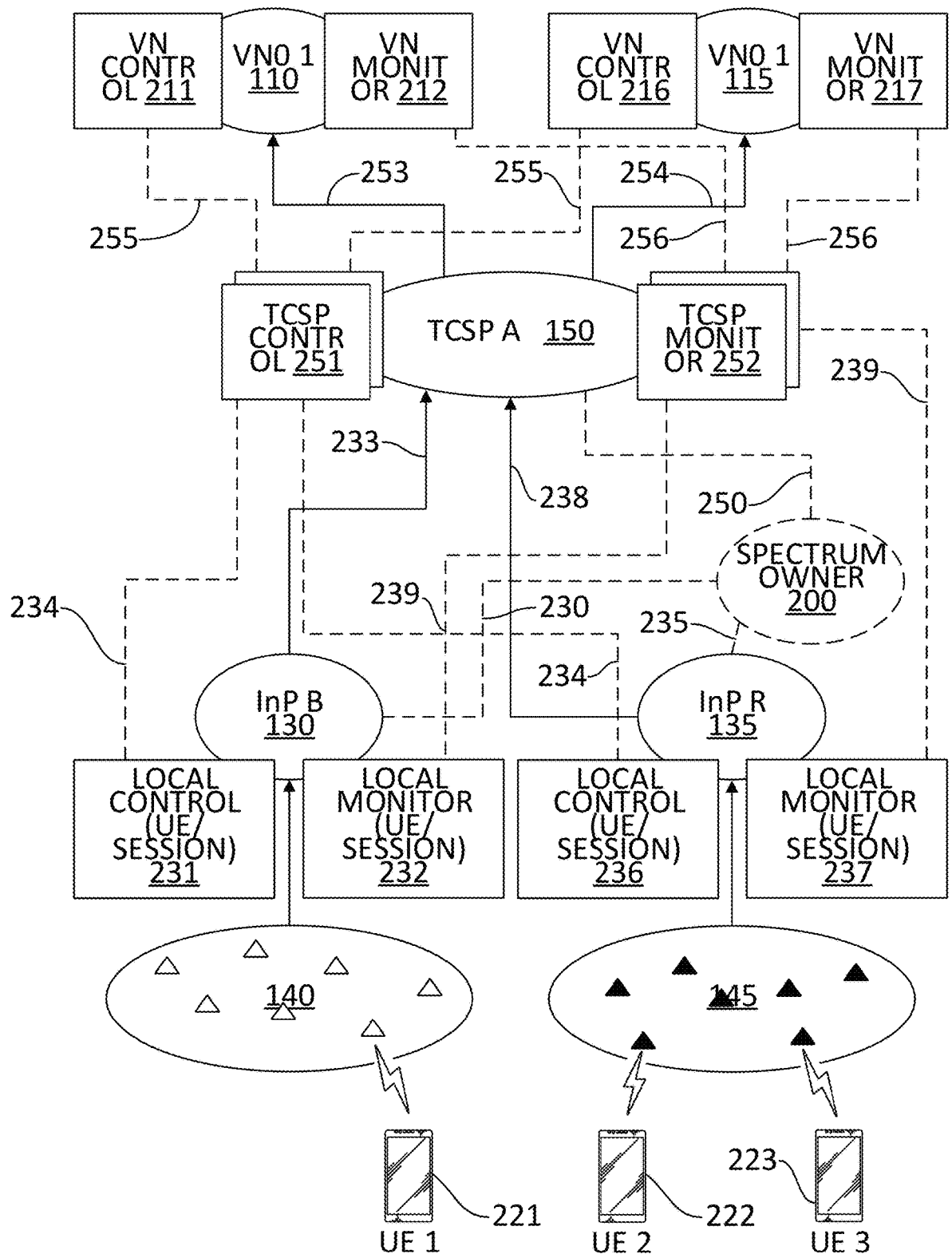
FIG. 2A is a logical view of example InPs and service providers according to an example of the present disclosure.

FIG. 2A is a conceptual block diagram showing services being provided between the three strata described in FIG. 1. The top stratum is represented by the VNOs 110, 115. Each of VNO 1 110 and VNO 2 115 is being offered a service 253, 254, such as by access to and control of allocated infrastructure 140, 145, by TCSP A 150. The type of service 253 offered by TCSP A 150 to VNO 1 110 may be the same as or different from that of the type of service 254 offered by TCSP A 150 to VNO 2 115.

In order to be in a position to offer the services 253, 254 to VNO 1 110 and/or to VNO 2 115, TCSP A 150 is offered an allocation 233, 238 of infrastructure 140, 145 and associated resources (such as access and control of the infrastructure 140, 145) by each of InP B 130 and InP R 135. When virtualized infrastructure (such as NFVI) is offered to TCSP A 150 by an InP 130, 135, it may be possible for the InP 130, 135 to scale the capacity of an element of the virtualized infrastructure to meet the needs of the TCSP 150. This may be considered as offering Infrastructure as a Service (IaaS), as the capacity of the infrastructure can be scaled to meet the needs of the TCSP 150. The allocation 233 offered by InP B 130 to TCSP A 150 may be the same as or different from that of the allocation 238 offered by InP R 135 to TCSP A 150.

The allocation 233, 238 offered by InP B 130 or InP R 135 respectively, can include, by way of non-limiting example, wireless connectivity through one of its APs 140, 145. In the figure, UE 1 221 takes advantage of this connectivity offered through allocation 233, and UE 2 222 and UE 3 223 take advantage of this connectivity offered through allocation 238.

While an InP 130, 135 may own infrastructure 140, 145, it may not own spectrum usage rights. A spectrum owner 200 may own no infrastructure 140, 145 and may not provide any services but may enter into an agreement 230, 235 with an InP 130, 135 to allow the InP 130, 135 to use spectrum for certain geographic areas. In one example, the spectrum owner 200 may also enter into an agreement 250 with a TCSP 150 to allow use of certain spectrum resources in different geographic areas. In such case, the TCSP 150 can instruct an InP 130, 130 to use spectrum bands to which it has ownership or access rights.

Figure 2B:
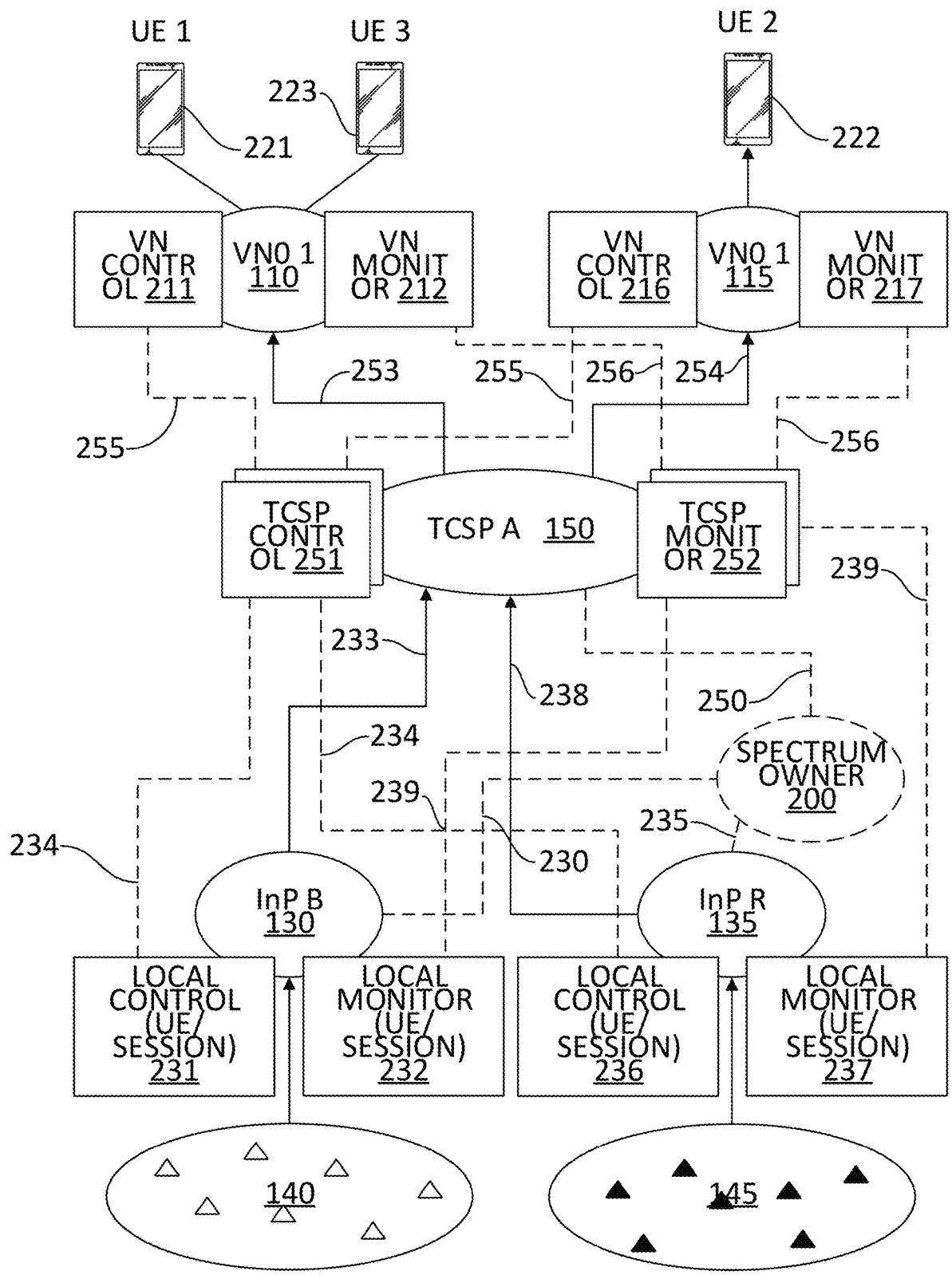
FIG. 2B is a re-ordered view of the example of FIG. 2A.

In FIG. 2B, the same example network is shown, but now it is may be seen that UE 1 221 and UE 3 223 are end-users subscribed to VNO 1 110, while UE 2 222 is an end-user subscribed to VNO 2 115.

One or more control elements or servers is shown for each of the VNO 110, 115, TCSP 150 and InP 130, 135 entities. One skilled in the art will appreciate that these control elements may be implemented as virtual functions instantiated upon the resources of the entity that uses them.

A first set of such control elements 211, 216, 251, 231, 236 is related to resource control (RC), authentication, authorization and accounting (AAA) and/or access control (AC) control communications.

RC features allocate a system's resources in a controlled fashion and may include, without limitation, scheduling, power control, cell assignment, selection of access points, bandwidth assignment and/or admission control (AC) and any combination of any of these.

An AAA service framework is typically associated with infrastructure 140, 145 for controlling access to computer resources, enforcing policies, auditing usage and providing information from which services can be billed.

AC, which may be considered a feature of RC, is a validation process in communications systems, where a check is performed before a connection is established to see if current resources are sufficient for the proposed connection and that the proposed connection is authorized or properly subscribed.

A second set of such control elements 212, 217, 252, 232, 237 is related to performance monitoring such as radio system status (including channel feedback, interference measurements, link loading, user equipment (UE) states and mobility information) and/or virtual network end-user performance monitoring (including data usage stats for charging). Such control elements are referred to as monitors.

A TCSP control element 251 and/or a TCSP monitor 252 is instantiated by TCSP A 150 within the resources of TCSP A 150, to support control communications with other entities. In some examples, there is a TCSP control element 251 and/or a TCSP monitor 252 for each VNO 110, 115 to which TCSP A 150 provides services 253, 254.

A VN control element 211, 216 and/or a VN monitor 212, 217 is instantiated by and associated with each of the VNOs 110, 115 within the resources that each VNO 110, 115 has obtained. The VN control element 211, 216 and/or the VN monitor 212, 217 support control communications at the VNO 110, 115 level. The VN control element 211, 216 and/or the VN monitor 212, 217 may be instantiated using a template of a control element or monitor made available to the associated VNO 110, 115 by TCSP A 150.

TCSP A 150 may instantiate one or more local control elements 231, 236 and/or local monitors 232, 237 using resources within each InP 130, 135. Each such local control element 231, 236 and/or local monitor 232, 237 provides control communication services 233, 238 to the TCSP 150. In some examples, TCSP A 150 may instantiate a local control element 231, 236 and/or a local monitor 232, 237 at the InP 130, 135 for each TCSP control element 251 and/or TCSP monitor 252 associated with a corresponding VN control element 211, 216 and/or VN monitor 212, 217 at a VNO 110, 115.

From the perspective of the TCSP control element 251, 256 (and the TCSP monitor 252, 257), the local control element 236 (and the local monitor 237) may be considered to be a downstream control element. Conversely, the TCSP control elements 251, 256 (and the TCSP monitors 252, 257) may be considered to be an upstream control element to the local control element 236 (and the local monitor 237).

Information may be exchanged 234 between TCSP control element(s) 251 and associated local control elements 231, 236 and information may be exchanged 253 between TCSP control element(s) 251 and associated VN control elements 211, 216. Similarly, information may be exchanged 239 between TCSP monitor(s) 252 and associated local monitors 232, 237 and information may be exchanged 256 between TCSP monitor(s) 252 and associate VN monitors 212, 217.

There are different ways of allocating infrastructure 140, 145 provided by the InPs 130, 135 to the TCSPs 150, 155, 160. One way to allocate infrastructure is to provide it for exclusive use of an individual TCSP 150, 155, 160. In such a scenario, the InPs 130, 135 are said to have provided the TCSPs 150, 155, 160 with a "hard slice" comprising the allocated infrastructure 140, 145. In such scenarios, the InP 130, 135 cedes full control (including scheduling, selection of APs, power control and other such resources) to the TCSPs 150, 155, 160 of RC, AAA and/or AC of the infrastructure 140, 145 and/or performance monitoring allocated in the hard slice. TCSP 150, 155, 160 control of the infrastructure 140, 145 may be restricted to prevent interference with infrastructure 140, 145 not allocated to the TCSP 150, 155, 160.

As opposed to the "hard slice" referred to above, a second approach to allocated resources is "soft slicing". In a soft slice, the allocation of infrastructure 140, 145 is not as clearly delineated. Instead of providing an allocation of a specified set of resources, the InP 130, 135 makes a commitment or service guarantee, within the context of a service level agreement (SLA), that specifies a looser infrastructure allocation.

For example, instead of setting aside a specified set of resource blocks for use by a TCSP 150, 155, 160, an InP 130, 135 may commit that within a certain confidence level, a specified percentage of the infrastructure 140, 145 can be allocated to the TCSP 150, 155, 160.

Alternatively, the commitment may be the allocation of a traffic measurement, while still specifying a confidence level. This allows the InP 130, 135 to specify an upper limit on the infrastructure 140, 145 used by a TCSP 150, 155, 160.

Because statistically, each of the TCSPs 150, 155, 160 will not use its full allocation of infrastructure 140, 145, the InP 130, 135 can sell allocations that total more than 100% of the available infrastructure. This allows the InP 130, 135 to maximize revenue and resource utilization. In soft slicing scenarios, the InPs 130, 135 only provide the TCSPs 150, 155, 160 with partial control of the RC, AAA and/or RC and/or performance monitoring of the infrastructure 140, 145 provided in the soft slice. The remainder of control remains with the InP 130, 135 to be exercised under direction of the TCSPs 150, 155, 160.

The infrastructure 140, 145 of an InP 130, 135 may be allocated to TCSPs 150, 155, 160 in various combinations of hard slices and/or soft slices, provided that the sum of the allocated hard slices will not exceed the total available infrastructure 140, 145 of the InP 130, 135.

A TCSP 150, 155, 160 may provide access to some or all of its (pooled) allocated infrastructure 140, 145 to one or more VNOs 110, 115. The TCSP 150, 155, 160 can provide the VNO 110, 115 with allocations that amount to either hard or soft slices of the (pooled) allocated infrastructure 140, 145.

While a hard slice of infrastructure 140, 145 can be further sliced into hard and soft slicest o be provided to VNOs 110, 115, it may not be possible to offer a hard slice of a soft slice of infrastructure 140, 145. If the TCSP 150, 155, 160 has been allocated a hard slice of infrastructure 140, 145, it may in turn allocate any combination of hard slices and/or soft slices of such hard slice to each VNO 110, 115, again provided that the sum of the allocations of hard slices and of the upper limits allocated in soft slices does not exceed the total of the infrastructure 140, 145 allocated to the TCSP 150, 155, 160 by the InP 130, 135.

In some examples, a TCSP 150, 155, 160 may be provided with an upper limit on use of the allocated infrastructure 140, 145, but with a guaranteed lower limit on such use. Such an allocation may be considered to comprise a hard slice of infrastructure 140, 145 up to the lower limit and a soft slice of infrastructure 140, 145 of the difference between the upper limit and the lower limit.

Figure 3:
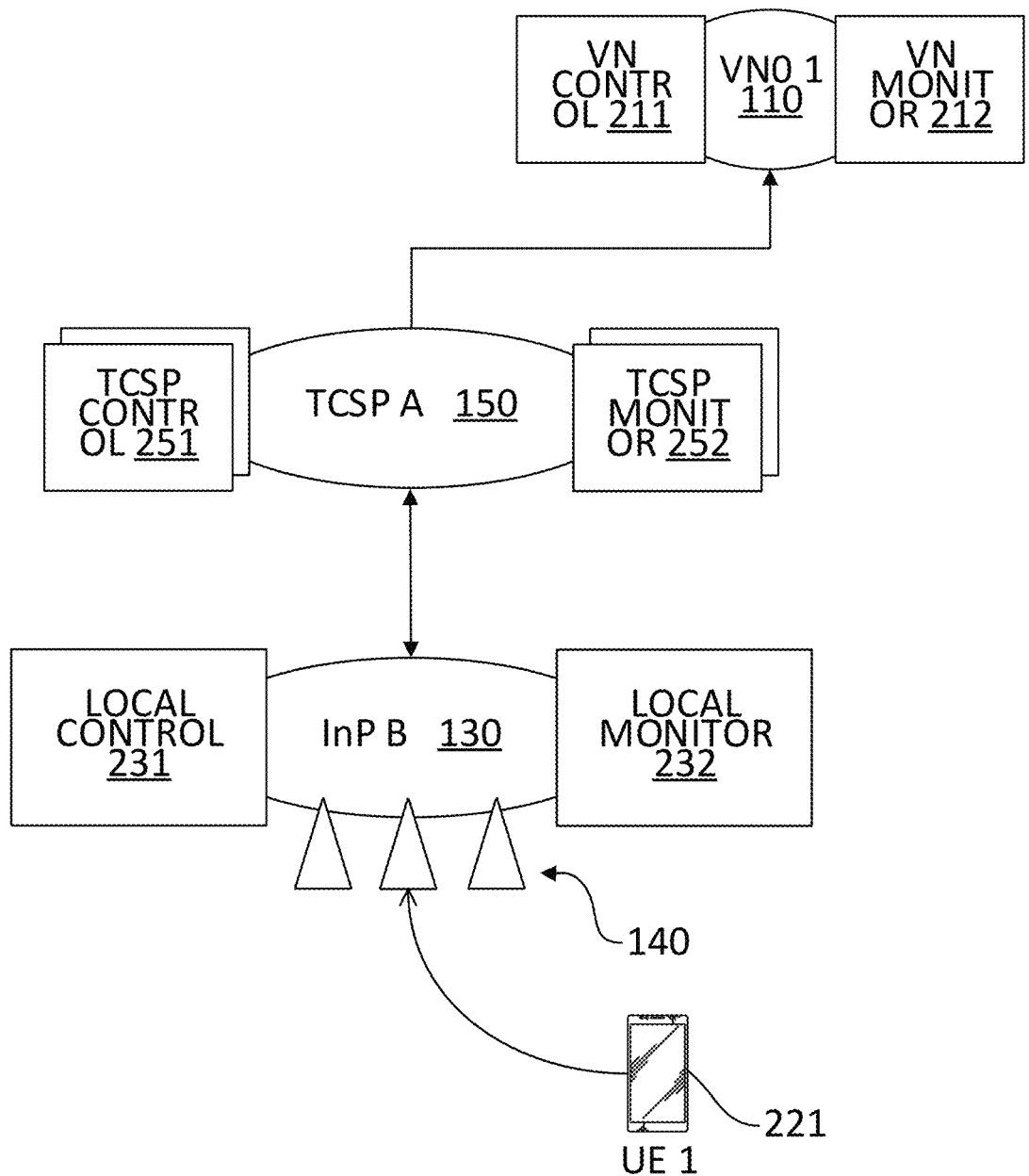
FIG. 3 is a block diagram of a first example class of scenario in which an InP's resources are fully used by a single telecom connectivity service provider (TCSP) according to examples of the present disclosure.

FIG. 3 is a schematic view of a first example class of scenarios in which the resources of InP B 130 are fully used by a single TCSP A 150 to which at least VNO1 110 is a subscriber. That is, a portion (in this case all) of the infrastructure 140 of InP B 130 is allocated to TCSP A 150, which assumes full control and monitoring capability over the infrastructure resources 140.

In a first example of the scenarios shown in FIG. 3, InP B 130 may be considered to be a "dumb pipe" in that InP B 130 cedes control to TCSP A 150, which performs all RC, AAA and/or RC through the TCSP control element 251. TCSP A 150 also performs all monitoring through the TCSP monitor 252. In some examples, the TCSP control element 251 and the TCSP monitor 232 may be supported by local control elements 231 and local monitors 232 at InP B 130.

By way of example, authentication of attached mobile devices and authorization of the authenticated mobile devices to access the infrastructure 140 may be performed through the TCSP control element 251, or through an instantiation of an AAA server (not shown) in the infrastructure 140 of InP B130 under control of the local control element 231. Such TCSP control element 251 and/or AAA server (not shown) may contain portions of AAA information associated with VNO 1 110. In such a case, the VNO control element 211 may provide AAA data to the TCSP control element 251, which then provides a subset of the received AAA data to the AAA server (not shown) instantiated within the infrastructure 140 of InP B 130. This allows authentication of mobile devices, such as UE 221 without the AAA process always passing from InP B 130 through TCSP A 150 for completion by VNO 1 110.

Thus, even with full control at the TCSP 150, the TCSP control element 251 and the TCSP monitor 252 may be in communication with the local control element 231 and the local monitor 232 respectively to request and to receive access to and control of the infrastructure 140.

The TCSP control function 251 may communicate with a local control function 231 through a defined application program interface (API), and the TCSP monitor 252 may communicate with local monitor 232 through another API.

The use of local control elements 231 and local monitors 232 may relieve the InP 130 of the burden of any customer level interactions. At the same time, such local elements 231, 232 help TCSP A 150 to provide services that meet any service level guarantees that it may have made to its subscribing VNOs using a single logical resource pool that incorporates infrastructure 140 across a plurality of different InPs 130. Such logical resource pool can be allocated among TCSP A 150's subscribing VNOs 110 using central optimization.

The "dumb pipe" example may be suitable provided control signal latency between TCSP A 150, InP B 130 and the infrastructure 140 owned by InP B 130 remains acceptably small.

In a second example of the scenarios shown in FIG. 3, InP B 130 retains limited control, in that the local control element 231 performs AC, AAA and/or RC and the local monitor 232 performs performance monitoring, both under the respective direction of the TCSP control element 251 and the TCSP monitor 252.

For example, the TCSP control element 251 of TCSP A 150 provides guidelines to InP B 130 for certain aspects, such as scheduling, power control, cell assignment and/or admission, through resource block masks that identify certain time windows made up of a plurality of time transmission intervals (TTIs) for a given frequency sub-band, subject to which the local control element 231 of InP B 130 is free to make frame-by-frame local decisions (including without limitation scheduling and power).

Further, the local monitor 232 of InP B 130 may provide regular radio system status reports (including without limitation channel feedback, interference measurements, link loading, user equipment states and mobility information) to the TCSP monitor 252 of TCSP A 150 on a regular and/or on an as-needed basis. Further, VN end-user performance monitoring is provided by the local monitor 232 of InP B 130 to the TCSP monitor 252 of TCSP A 150 by which VNO 1 110 may be charged.

Thus, in such example, a considerable level of intelligence on the part of TCSP A 150 is still called for.

Such limited control example may be suitable when the control signal latency between TCSP A 150 and InP B 130 is too large to make the dumb pipe example viable or in situations where InP B 130 does not wish to cede full control to TCSP A 150.

As with the dumb pipe example, the local AAA server (not shown) of InP B 130 may be employed to discover when unauthorized UEs 221, for example those not supported by TCSP A 150, are attempting to access the infrastructure 140 allocated to TCSP A 150 by InP B 130.

Figure 4:
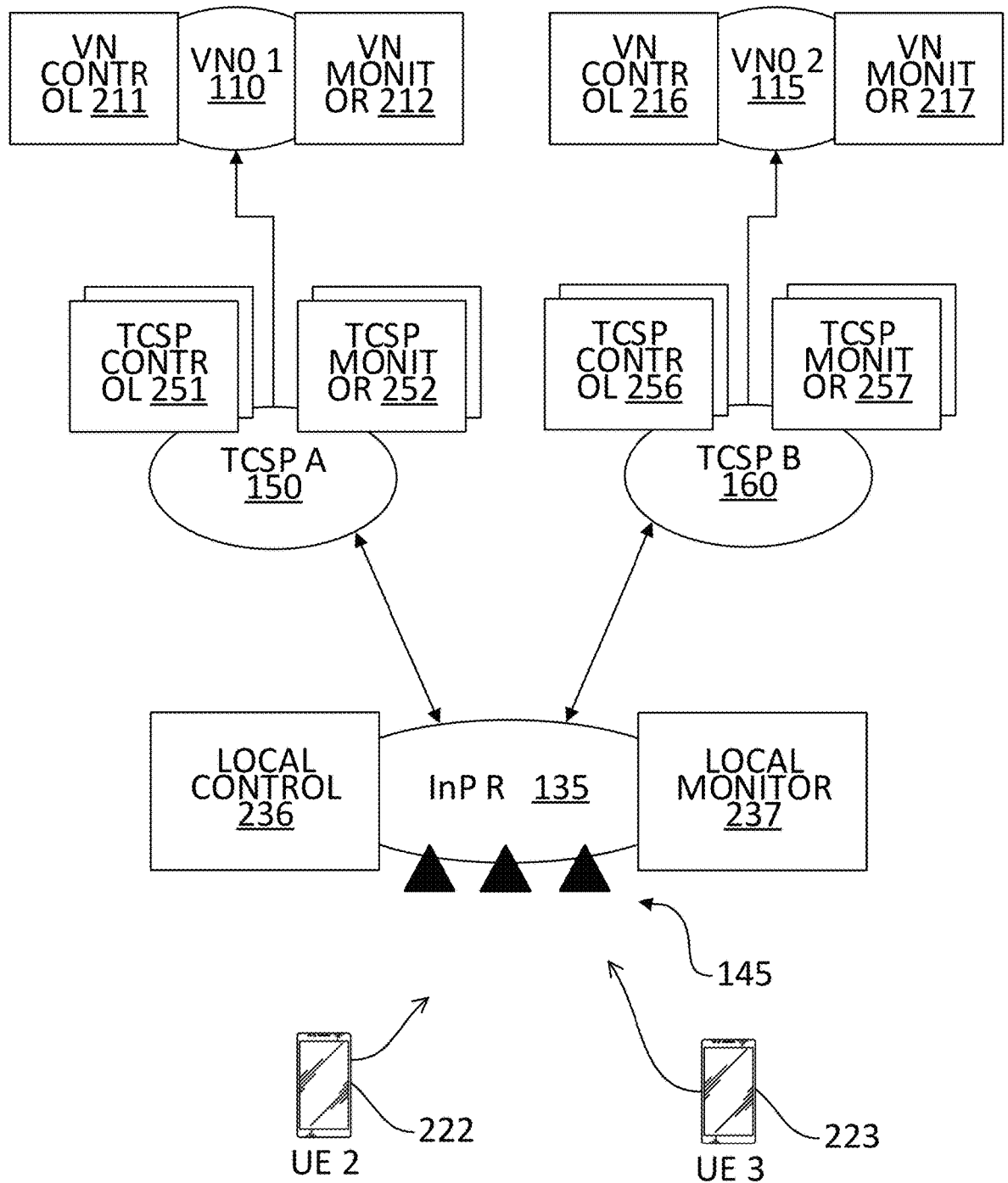
FIG. 4 is a block diagram of a second example class of scenario in which an InP's resources are shared among multiple TCSPs according to an example of the present disclosure.

FIG. 4 is a schematic view of a second example class of scenarios, in which the infrastructure 145 of InP R 135 is shared among a plurality of TCSPs, in this case, TCSP A 150 and TCSP B 160. VNO 1 110 and VNO 2 115 are subscribers to each of TCSP A 150 and TCSP B 160. In this second class of scenario, InP R 135 shares its infrastructure 145 among multiple TCSPs 150, 160.

In this class of scenarios, VNO 1 110 and VNO 2 115 each have their own VN control elements, 211, 216, as well as VN monitors 212, 217. Each of TCSP A 150 and TCSP B 160 have a TCSP control element, respectively 251, 256 and/or TCSP monitor, respectively 252, 257. InP R 135 has a local control element 236 and a local monitor 237. The TCSP control element 251, 256 and/or the TCSP monitor 252, 257 may be in communication with the local control element 236 and/or local monitor 237 to request and/or receive access to and control of the infrastructure 145.

In a first example of the scenario shown in FIG. 4, InP R 135 allocates separate hard slices, each with full control of the infrastructure 145 of InP R 135 to each of TCSP A 150 and TCSP B 160. InP R 135 can present to each of TCSP A 150 and TCSP B 160 separate network slices in which virtualized resources are provided. The virtualized resources can map directly to physical infrastructure 145. In such example, each of TCSP A 150 and TCSP B 160 is ceded control and/or monitoring access and responsibility for its allocated infrastructure 145. By providing each TCSP 150, 160 with a different network slice, InP R 135 can cede control while isolating traffic from each TCSP 150, 160 at the same time. This example can be considered to be an extension of the "dumb pipe" example, with each slice of the infrastructure 145 of InP R 135 being considered to be all of the infrastructure of a virtual InP (not shown) dedicated to a given TCSP 150, 160.

In another example, slices are not allocated, but each of TCSP A 150 and TCSP B 160 is ceded control over its allocated infrastructure. This example may not provide traffic isolation, but may be less complex to implement.

In a second example of the scenario shown in FIG. 4, InP R 135 allocates a hard slice with partial control of the infrastructure 145 to each of TCSP A 150 and TCSP B 160. In such example, InP R 135 retains limited control, in that the local control element 236 performs AC, AAA and/or RC and the local monitor 237 performs performance monitoring. InP R 135's exercise of this limited control is subject to direction from each TCSP control element 251, 256 and each TCSP monitor 252, 257. This scenario can be considered to be an extension of the limited control example, with each slice of the infrastructure 145 of InP R 135 being considered to be all of the infrastructure of a virtual InP (not shown) dedicated to a given TCSP 150, 160.

In a third example of the scenario shown in FIG. 4, InP R 135 allocates a soft slice (that is, an upper limit on use of the infrastructure 145) to each of TCSP A 150 and TCSP B 160. Such an example may be suitable when InP R 135 is able to resolve any resource contention-related conflicts between TCSP A 150 and TCSP B 160.

For example, InP R 135 may provide dynamic resource state feedback to both TCSP A 150 and TCSP B 160. Such feedback may comprise resource usage data, which may also indicate additional resources available to the TCSP 150, 160 at that time, and indicates permissible areas on a dynamically changing basis. TCSP A 150 and TCSP B 160 thereafter perform their own scheduling of their use of their allocated slice of the infrastructure 145.

Figure 5:
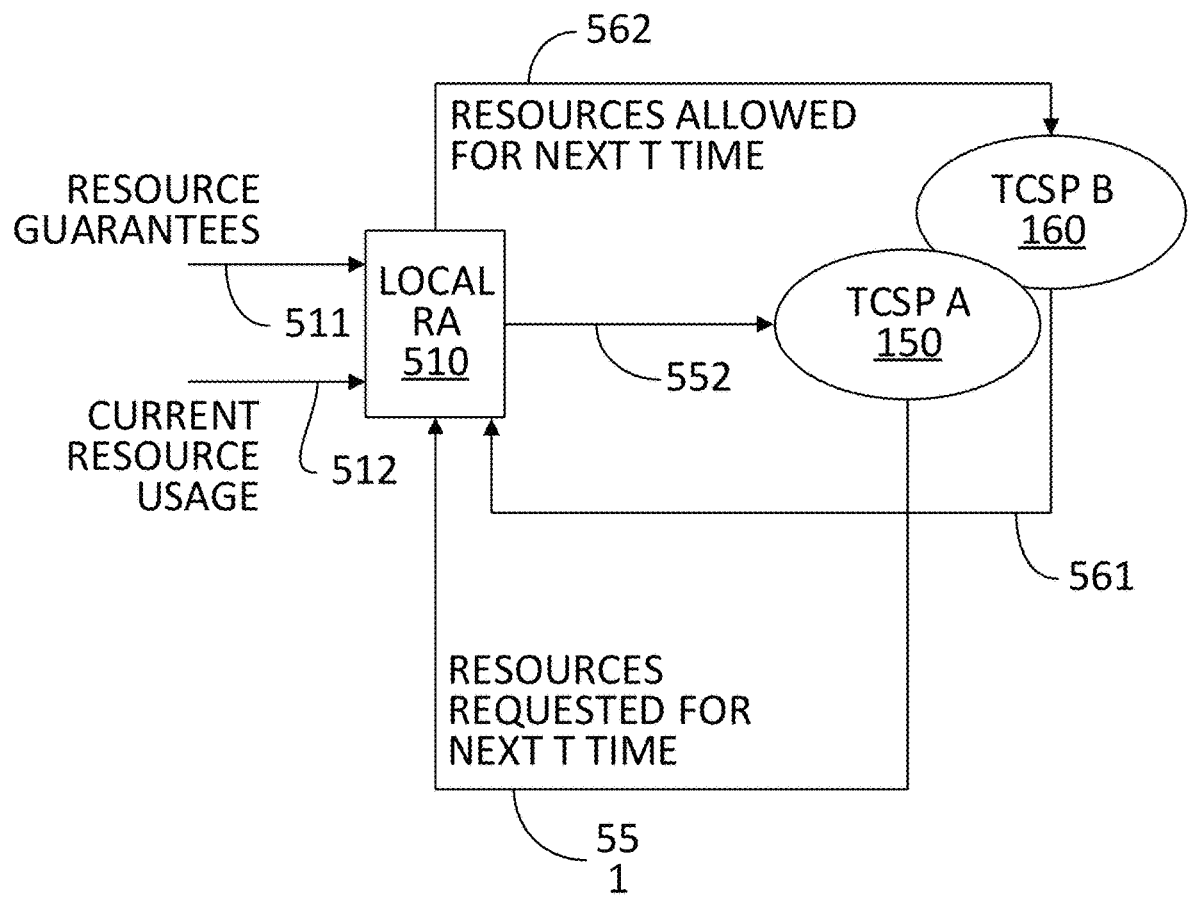
FIG. 5 is a block diagram of a dynamic resource assignment mechanism suitable for use in conjunction with some examples of FIG. 4.

FIG. 5 shows a non-limiting example embodiment of a mechanism implemented by InP R 135 for providing such dynamic resource state feedback. A resource assignor 510 accepts three inputs, namely resource guarantees 511 that InP R 135 has provided to each of TCSP A 150 and TCSP B 160, a measure 512 of current usage of the resource associated with InP R 135 and a request 551, 561 from each of TCSP A 150 and TCSP B 160 for resources for an upcoming transmission time interval (TTI) T.

For example, the soft slice allocated by InP R 135 to TCSP A 150 may be allocated with a resource guarantee 511 that TCSP A 150 will receive a given percentage of the infrastructure 145 of InP R 135 on average, over a time window of a given number of TTIs.

The resource assignor 510 assigns allowed resources 552, 562 for each TTI to each of TCSP A 150 and TCSP B 160, based on the resource guarantee parameters 511, the current resource usage 512 and the resource requests 551, 561 received.

The dynamic resource state feedback provided by InP R 135 to each of TCSP A 150 and TCSP B 160 permits the TCSPs 150, 160 to perform scheduling despite the fact that the infrastructure 145 is allocated not on an exclusive basis. Each TCSP 150, 160 is otherwise given full control of and access to, monitoring of and/or responsibility for the infrastructure 145 that it has been allocated under the soft slice.

Further, in such example, channel states and resource utilization and user Quality of Service (QoS) can be sent by the local control element 236 to the TCSP control elements 251, 256.

In some cases, when the channels in adjacent cells are used by different TCSPs 150, 160, it may be appropriate to establish interference agreements between the TCSPs 150, 160. Such agreements may be static or dynamic.

In a fourth example of the scenario shown in FIG. 4, InP R 135 allocates a soft slice with partial control of the infrastructure 145 to each of TCSP A 150 and TCSP B 160. In such example, InP R 135 retains limited control, including over scheduling, in that the local control element 236 performs AC, AAA and/or RC and the local monitor 237 performs performance monitoring. InP R 135's exercise of this limited control is subject to direction from each TCSP control element 251, 256 and each TCSP monitor 252, 257.

When the local control element 236 grants resource access to TCSP A 150, TCSP A 150 obtains the allocated slice with full power control. In some cases, TCSP A 150 may assign a scheduling priority within its own traffic.

Figure 6:
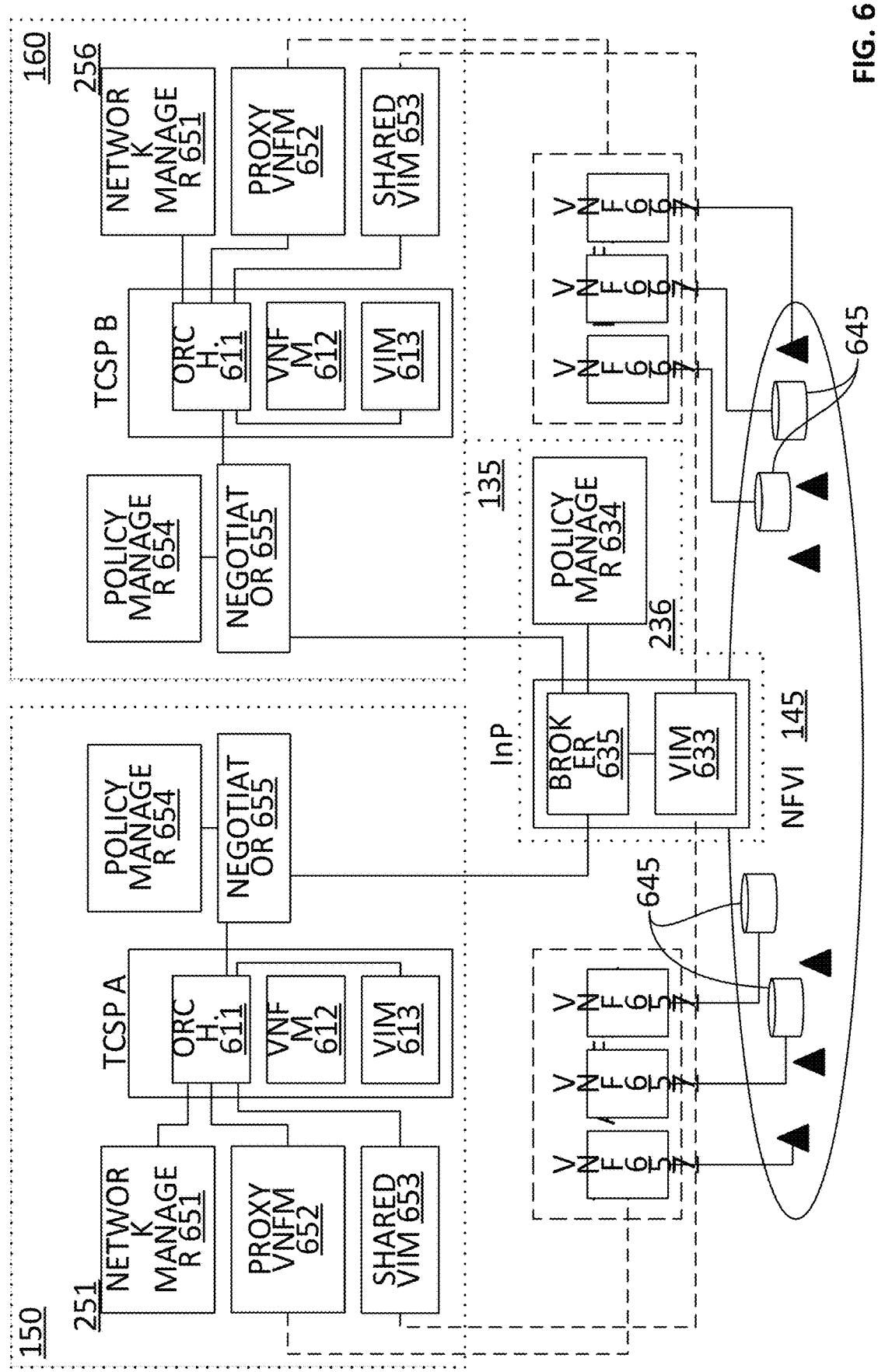
FIG. 6 is a block diagram illustrating example components of an InP and TCSPs suitable for providing an infrastructure as a service (IaaS) capability from an InP to a TCSP in the scenario of FIG. 4.

FIG. 6 is a block diagram illustrating example components of InP R 135, TCSP A 150 and TCSP B 160 suitable for allocating the infrastructure 145 of InP R 135 to TCSP A 150 and TCSP B 160 in the scenarios of FIG. 4.

There may be other entities of one or more of the TCSPs 150, 160 and/or InPR 135, that are not shown for clarity and simplicity of explanation. Further, one or more of the shown entities may be omitted or substituted for by other component(s).

TCSP A 150 and TCSP B 160 are shown in terms of certain of their constituent entities, namely, for the purposes of this Figure, a Management ANd Orchestrator (MANO) entity 610, and the TCSP control element 251, 256. These entities together act to instantiate a set of virtualized network functions (VNFs) 657 (collectively 656), 667 (collectively 666) for the associated TCSPs 150, 160 on the infrastructure 145 allocated to each TCSP 150, 160.

The MANO 610 may comprise an Orchestrator 611, a VNF manager (VNFM) 612 and a Virtual Infrastructure Manager (VIM) 613.

The Orchestrator 611 is responsible for instantiating and managing a VNF 656 in conjunction with the VNFM 612 and the VIM 613, for say TCSP A 150, on the pooled resources of TCSP A 150, including the infrastructure 145 allocated to TCSP A 150 by InP R 135. The Orchestrator 611 identifies suitable Point of Presence (PoP) entities or nodes 645 owned by and/or allocated to the TCSP 150, 160 on which to host VNFs 657 and passes these PoP locations onto the VNFM 612.

The VNFM 612 performs lifecycle management of a VNF 657 associated with TCSP A 150, 160 on the PoPs 645 of TCSP A 150, which may consist of, at various times, on-boarding, instantiating, configuring, activating and eventually deactivating the VNF 657.

The VIM 613 manages the pooled resources of TCSP A 150.

In FIG. 6, each TCSP control element 251, 256 comprises a Network Manager 651, a Proxy VNFM 652, a Shared VIM 653, a Policy Manager 654 and a Negotiator entity 655 for the corresponding TCSP 150, 160.

The Network Manager 651 provides service-related demands to the Orchestrator 611 as service requests.

In the case of TCSP A 150, the Proxy VNFM 652 performs lifecycle management of a VNF 657 on PoPs 645 allocated by InP R 135 to TCSP A 150.

The Shared VIM 653 manages the infrastructure 145 of InP R 135 allocated to TCSP A 150 in conjunction with the local control element 236 of InP R 135.

The Policy Manager 654 is responsible for maintaining and ensuring that the service-related demands, such as, by way of non-limiting example, Key Performance Indicators (KPIs) and costing/financial constraints of say TCSP A 150 are enforced. The Policy Manager 654 can be an internal function of the Orchestrator 611 or an external entity. The Policy Manager 654 identifies an acceptable resource policy to the Negotiator entity 655.

The Negotiator entity 655 of TCSP A 150 negotiates with InP R 135 to arrive at a negotiated resource usage policy that is in line with the acceptable resource policy identified by the Policy Manager 654. Once such a policy is established, the VNFs 657 associated with TCSP A 150 (instantiated using the infrastructure 145 allocated to TCSP A 150) can be managed and/or controlled by TCSP A 150 through the Proxy VNFM 652 and Shared VIM 653 in conjunction with the local control element 236 of InP R 135.

InP R 135 is also shown in terms of certain of its constituent entities, namely, local control element 236. The local control element 236 comprises a VIM 633, a Policy Manager 634 and a Broker entity 655.

Like the VIM 613, the VIM 633 manages the infrastructure 645 of InP R 135, in conjunction with the respective Shared VIMs 653 of TCSP A 150 and TCSP B 160.

The Policy Manager 634 is responsible for maintaining and ensuring that the service-related demands, such as, by way of non-limiting example, KPIs and costing/financial constraints of InP R 135 are enforced. The Policy Manager 634 may be an internal function of InP R 135 or an external entity. The Policy Manager 634 identifies an acceptable resource policy to the Broker entity 635.

The Broker entity 635 determines a resource usage policy for all TCSPs 150, 160 by negotiating with individual Negotiator entities 655 of the TCSPs 150, 160 to arrive at a negotiated resource usage policy that is in line with the acceptable resource policy identified by the Policy Manager 634.

Figure 7:
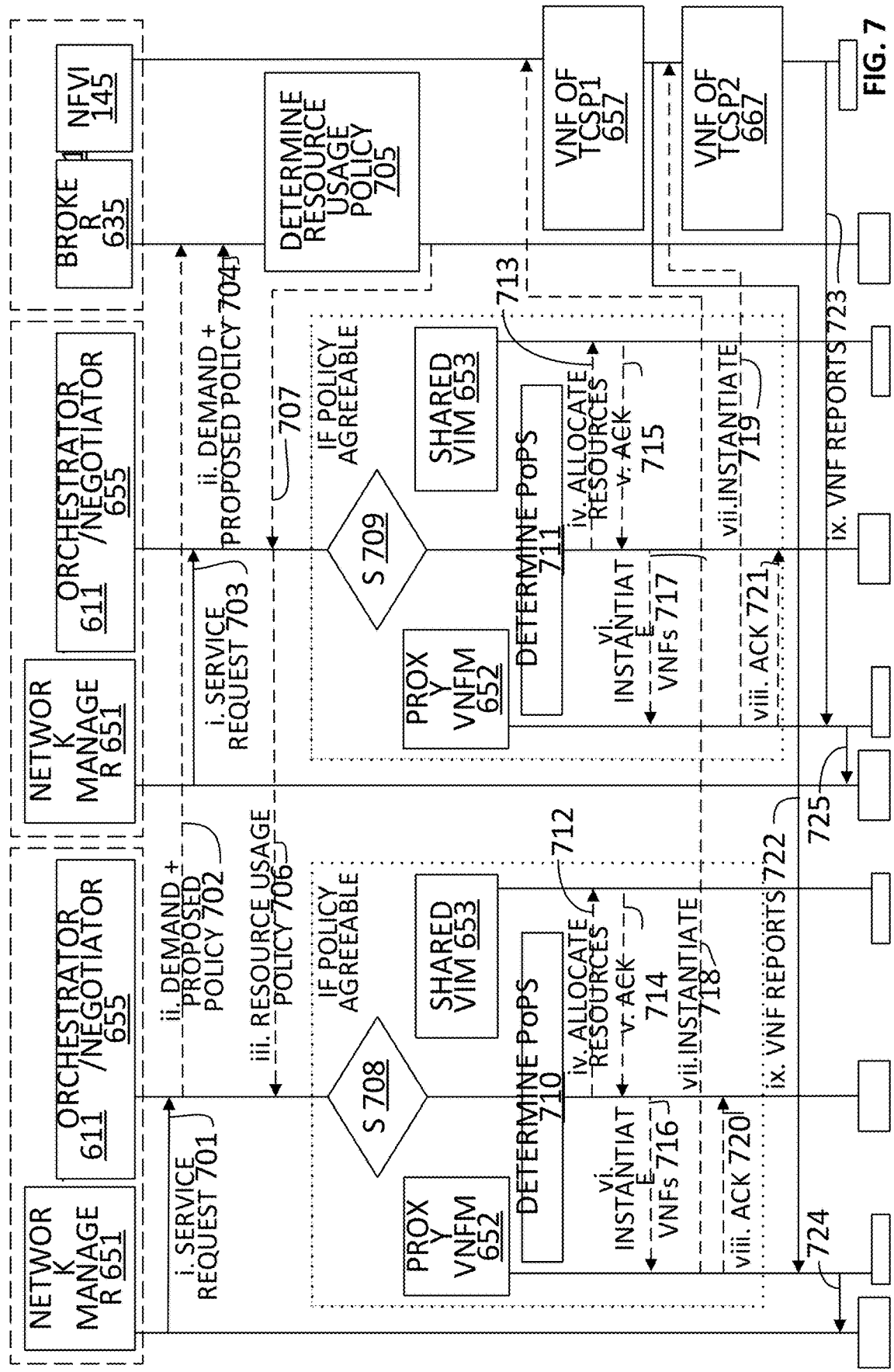
FIG. 7 is a signal flow diagram showing example signals exchanged between the components of FIG. 6.

FIG. 7 is a signal flow diagram showing example signals that may be exchanged between the components of FIG. 6.

The Network Manager 651 of TCSP A 150 and TCSP B 160 each send 701, 703 a service request for infrastructure 145 to their Orchestrator 611. The service request may include VNF requests (including without limitation, SDN controller (SDN-C), Scheduler and Quality of Service (QoS) probes), NFVI usage requests (including without limitation, for computation, storage and network), spectrum usage requests, and traffic QoS demands (including without limitation, rate and delay).

The Negotiator entity 655 of TCSP A 150 and TCSP B 160 each send a request 702, 704 to the Broker entity 635 of InP R 135 containing their resource usage demands and, in consultation with their Policy Manager 654, their proposed resource usage policy.

In conjunction with the Policy Manager 634 of InP R 135, the Broker entity 635 of InP R 135 uses the service request(s) to determine a proposed combined resource usage policy 705 taking into consideration all parties involved and communicates 706, 707 an individualized resource usage policy (which in some examples could be a determination of hard slicing vs. soft slicing, what resources are included in the slice and/or what restrictions there may be on the soft slice) to the Negotiator entities 655 of TCSP A 150 and TCSP B 160.

If the proposed resource usage policy 705 is not agreeable to both TCSP A 150 and TCSP B 160, actions and flows 702-707 are repeated until a resource usage policy 705 is agreed to.

When the proposed resource usage policy 705 is agreeable 708 to TCSP A 150 and 709 to TCSP B 160, the Orchestrator 611 of TCSP A 150 and TCSP B 160 will each optimize and identify 710, 711 suitable PoPs 645 for hosting their VNFs 656, 666 and resource usage (including without limitation, spectrum) associated with the infrastructure 145 allocated to TCSP A 150 and TCSP B 160.

Orchestrator 611 of TCSP A 150 and TCSP B 160 each send 712, 713 a request to their Shared VIM 653 to allocate resources associated with their identified PoPs 645.

The Shared VIMs 653 of TCSP A 150 and TCSP B 160 respectively send 714, 715 an acknowledgement back to the Orchestrator 611 of TCSP A 150 and TCSP B 160 respectively when this is done.

Orchestrator 611 of TCSP A 150 and TCSP B 160 each send 716, 717 a request to their Proxy VNFM 652 to instantiate one or more VNFs 657, 667 using the infrastructure 145 allocated to TCSP A 150 and TCSP B 160.

Proxy VNFM 652 of TCSP A 150 AND TCSP B 160 each instantiate 718, 719 one or more VNFs 657, 667 using the infrastructure 145 allocated to TCSP A 150 and TCSP B 160.

Proxy VNFM 652 of TCSP A 150 and TCSP B 160 each send 720, 721 an acknowledgement back to their Orchestrator 611.

The procedure whereby the Orchestrator 611 instructs its Shared VIM 653 to allocate resources and the Proxy VFNM 652 instantiates VNF(s) 657, 667 at PoPs 645 may be achieved through internal signalling within the NFV-MANO 610 of the respective TCSP 150, 160.

When the VNF(s) 657, 667 have been instantiated, report(s) 722, 723 are sent by the VNF(s) 657, 667 back to their Proxy VNFM 652.

When such reports 722, 723 are received, Proxy VNFM 652 of TCSP A 150 and TCSP B 160 each forward 724, 725 them to their Network Manager 651.

Once the VNF(s) 657, 667 are fully active, the individual TCSPs 150, 160 can access and manage their respective VNF(s) 657, 667 through their Proxy VNFM 652.

Thus, for hard resource slicing, each TCSP 150, 160 can manage its own VNF(s). For soft resource slicing, contention for infrastructure 145 may be resolved through a new round of resource negotiations by the Negotiator entity 655 of the TCSPs 150, 160 sharing the resource(s) 145 in collaboration with the Broker entity 635 of the InP 135. Such negotiations could be distributive or iterative in nature.

Figure 8:
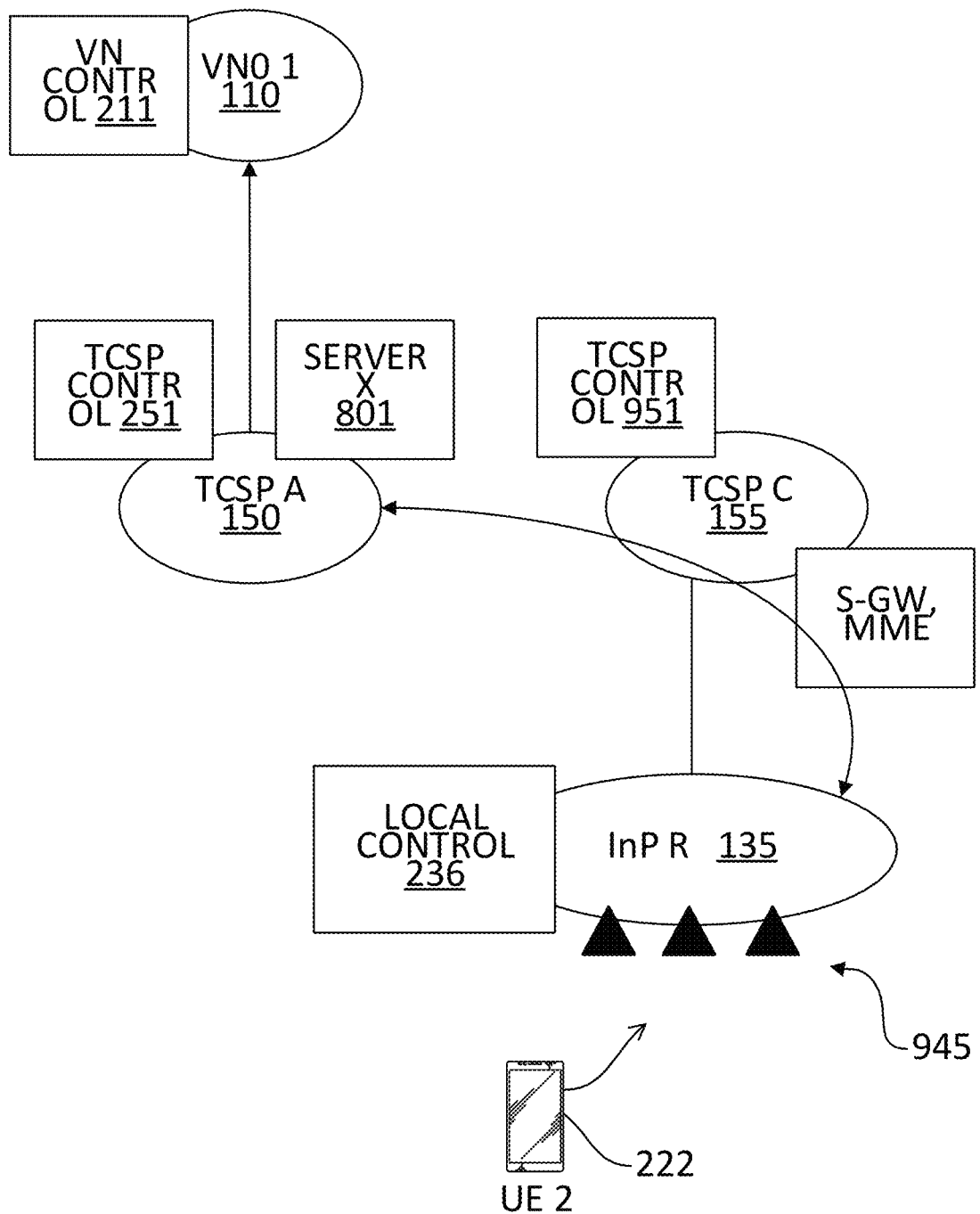
FIG. 8 is a block diagram of a third example class of scenarios in which resources of an InP are shared among multiple TCSPs according to an example of the present disclosure.

FIG. 8 is a schematic view of a third example class of scenarios in which infrastructure 945 of InP R 135 is shared among multiple TCSPs, in this case, TCSP A 150 and a TCSP C 155 interposed between InP R 135 and TCSP A 150. In such an example, and from the perspective of TCSP A 150, TCSP C 155 acts in a manner that emulates an InP 130, 135 to TCSP A 150. TCSP A 150 may be considered to be an upstream TCSP relative to TCSP C 155 and TCSP C 155 may be considered to be a downstream TCSP relative to TCSP A 150.

TCSP A 150 "re-borrows" from TCSP C 155, the infrastructure 945 that InP R 135 allocated to TCSP C 155. TCSP C 155 may have obtained a hard or soft slice of such infrastructure 945 with full or partial control, such as has been described in connection with the scenarios of FIG. 3 or 4 or otherwise.

The scenario of FIG. 8 may occur, for example, if TCSP A 150 does not have any way to access InP R 135 directly but desires to use infrastructure 945 from InP R 135, for example, in order to provide guaranteed service to UE 2 222, as it accesses a server, for example Server X 801.

In the scenario shown, TCSP A 150 is aware that the infrastructure 945 of InP R 135 can be used to provide such service to UE 2 222, and that the infrastructure 945 has been allocated to TCSP C 155. Thus, TCSP A 150 requests that the desired infrastructure 945 (for example, links and radio access) be allocated to TCSP A 150 by TCSP C 155.

FIG. 9 is a block diagram illustrating example components of InP R 135, TCSP A 150 and TCSP C 155 suitable for allocating the infrastructure 945 of InP R 135 to TCSP A 150 through TCSP C 155 in the scenario of FIG. 8.

In FIG. 9, TCSP A 150 is also shown having infrastructure 145 allocated to it from one or more InPs 130, 135 through a mechanism described above (including by way of non-limiting example, in connection with FIG. 7), in association with which it instantiates NFVs 656, in addition to having infrastructure 945 allocated to it by TCSP C 155. Further, TCSP C 155 may instantiate NFVs 966 using infrastructure 945 allocated to it by InP 135, that it accesses through a mechanism described above, including by way of non-limiting example, in connection with FIG. 7.

TCSP A 150 and TCSP C 155 are shown in terms of certain of their constituent entities, namely, for the purposes of this Figure, the MANO entity 610, and the TCSP control element 251, 951.

The TCSP control element 251 described in FIG. 6 and in this figure shows a different configuration of components than is shown in the TCSP control element 951 and vice versa. As discussed above, TCSP control element 251 may have, in addition to or in substitution for some of the components shown, some of the components shown in the TCSP control element 951 and vice versa.

Thus, the TCSP control element 951 (and the TCSP monitor (not shown)) of TCSP C 155 may be considered to be a downstream control element to the TCSP control element 251 (and the TCSP monitor 252) of TCSP A 150 and conversely, the TCSP control element 251 (and the TCSP monitor 252) of TCSP A 150 may be considered to be an upstream control element to the TCSP control element 951 (and the TCSP monitor (not shown)) of TCSP C 155.

The TCSP control element 951 comprises a Network Manager 651, a Policy Manager 934 and a Broker entity 935.

The Policy Manager 954, like the Policy Manager 654, is responsible for maintaining and ensuring that the service-related demands of TCSP C 155 are enforced. The Policy Manager 954 may be an internal function of the Orchestrator 611 or an external entity. The Policy Manager 954 identifies an acceptable resource policy to the Broker entity 935. In some examples, the Policy Manager 954 may be similar in purpose and/or function to the Policy Manager 654 in that it may also identify an acceptable resource policy to an associated Negotiator entity 655.

The Broker entity 935 determines a resource usage policy for TCSP A 150 by negotiating with the Negotiator entity 655 of TCSP A 150 to arrive at a negotiated resource usage policy that is in line with the acceptable resource policy identified by the Policy Manager 954. Once such a policy is established, the VNFs 956 associated with TCSP A 150 using the infrastructure 945 allocated to TCSP C 155 can be managed and/or controlled by TCSP A 150 through the Proxy VNFM 652 and Shared VIM 653 in conjunction with the local control element 236 of InP R135.

That is, TCSP C 155, via its NFV-MANO 610, is able to provide network orchestration capability with full and/or partial control of the VNFs 956 and infrastructure 945 to TCSP A 150.

Figure 10:
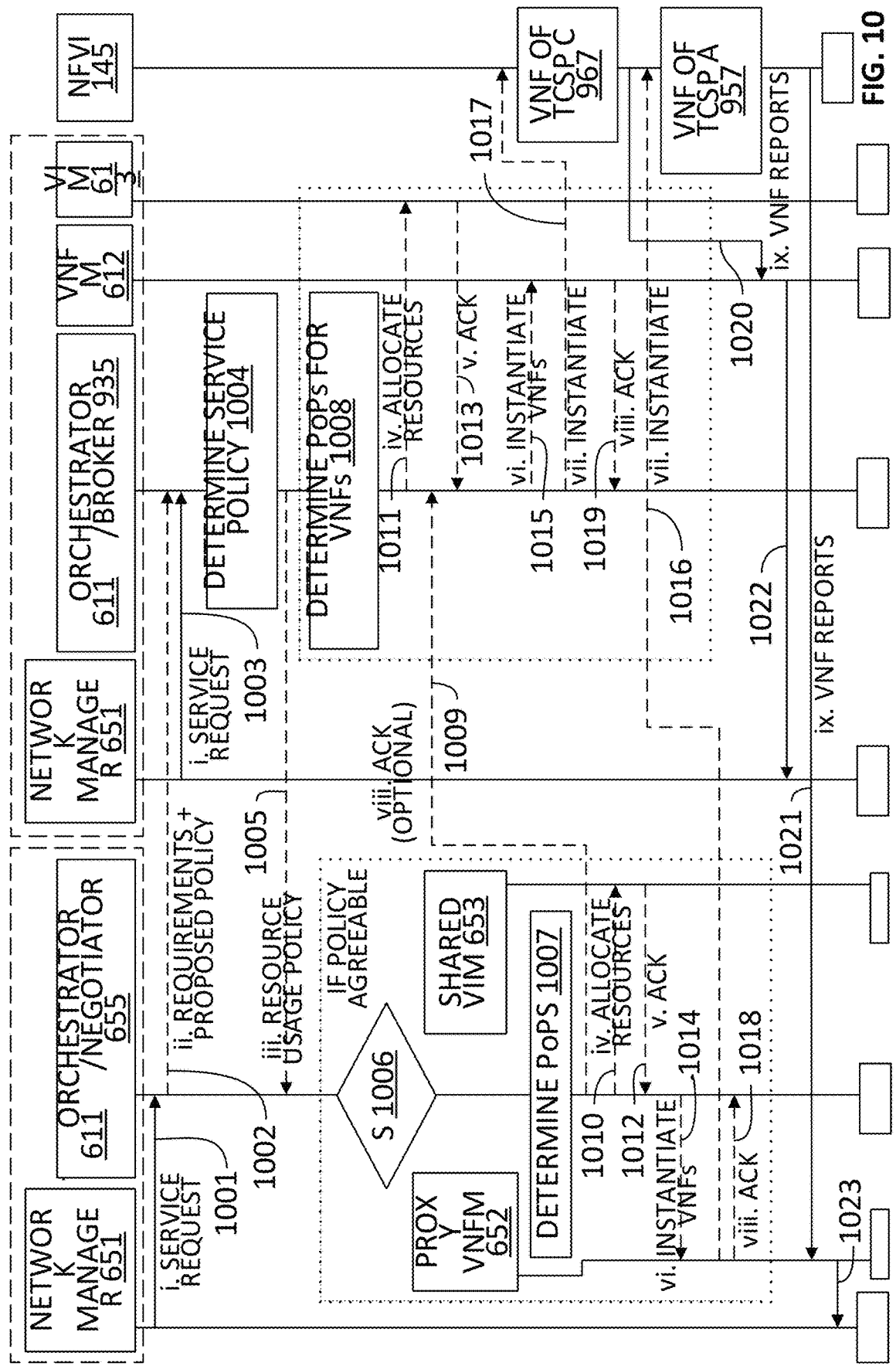
FIG. 10 is a signal flow diagram showing example signals exchanged between the components of FIG. 9.

FIG. 10 is a signal flow diagram showing example signals that may be exchanged between the components of FIG. 9.

The Network Manager 651 of TCSP A 150 sends 1001 a service request for resources to the Orchestrator 611 of TCSP A 150. The service request may include VNF requests (including without limitation, SDN-C, Scheduler and QoS probes), NFVI requests (including without limitation, for computation, storage and network), spectrum usage requests, and traffic QoS demands (including without limitation, rate and delay).

The Negotiator entity 655 of TCSP A 150 sends a request 1002 to the Broker entity 935 of TCSP C 155 containing the resource usage demands and, in consultation with the Policy Manager 654 of TCSP A 150, a proposed resource usage policy of TCSP A 150.

The Network Manager 651 of TCSP C 155 sends 1003 a service request for resources to the Orchestrator 611 of TCSP C 155. The service request may include VNF requests (including without limitation, SDN-C, Scheduler and QoS probes), NFVI requests (including without limitation, for computation, storage and network), spectrum usage requests, and traffic QoS demands (including without limitation, rate and delay).

The Orchestrator 611 of TCSP C 155 forwards this information on to Broker entity 935 of TCSP C 155 containing the resource usage demands and, in consultation with the Policy Manager 954 of TCSP C 155, a proposed resource usage policy of TCSP C 155.

In conjunction with the Policy Manager 954 of TCSP C 155, the Broker entity 935 of TCSP C 155 uses the service request(s) to determine a proposed combined resource usage policy 1004 taking into consideration all parties involved and communicates 1005 an individualized resource usage policy (which in some example embodiments could be a determination of hard slicing vs. soft slicing, what resources are included in the slice and what restrictions there may be on the soft slice) to the Negotiator entity 655 of TCSP A 150.

If the proposed resource usage policy 1004 is not agreeable to both TCSP A 150 and TCSP C 155, actions and flows 1002-1005 are repeated until a resource policy 1004 is agreed to.

When the proposed resource usage policy 1004 is agreeable 1006 to both TCSP A 150 and TCSP C 155, the Orchestrator 611 of TCSP A 150 and TCSP C 155 will each optimize and identify 1007, 1008 suitable PoPs 645 for hosting their VNFs 656, 966 and resource usage (including without limitation, spectrum) associated with the infrastructure 945 allocated by InP R 135 to TCSP C 155.

The Orchestrator 611 of TCSP A 150 may send 1009 an acknowledgement back to the Broker 935 of TCSP C 155.

Orchestrator 611 of TCSP A 150 sends 1010 a request to the Shared VIM 653 of TCSP A 150 to allocate resources associated with the identified PoPs 645 and Orchestrator 611 of TCSP C 155 sends 1011 a request to the VIM 613 of TCSP C 155 to allocate resources associated with the identified PoPs 645.

Shared VIM 653 of TCSP A 150 sends 1012 an acknowledgement back to the Orchestrator 611 of TCSP A 150 and the VIM 613 of TCSP C 155 sends 1013 an acknowledgement back to the Orchestrator 611 of TCSP C 155 when this is done.

Orchestrator 611 of TCSP A 150 sends 1014 a request to the Proxy VNFM 652 of TCSP A 150 to instantiate one or more VNFs 657 using the infrastructure 945 allocated by TCSP C 155 to TCSP A 150 and Orchestrator 611 of TCSP C 155 sends 1015 a request to the VNFM 612 of TCSP C 155 to instantiate one or more VNFs 967 using the infrastructure 945 allocated to TCSP C 155.

Proxy VNFM 652 of TCSP A 150 instantiates 1016 one or more VNFs 957 using the infrastructure 945 allocated by TCSP C 155 to TCSP A 150 and VNFM 612 of TCSP C 155 instantiates 1017 one or more VNFs 967 using the infrastructure 945 allocated to TCSP C 155.

Proxy VNFM 652 of TCSP A 150 sends 1018 an acknowledgement back to the Orchestrator 611 of TCSP A 150 and VNFM 612 of TCSP C 155 sends 1019 an acknowledgement back to the Orchestrator 611 of TCSP C 155.

The procedure whereby the Orchestrator 611 instructs the Shared VIM 653 to allocate resources and the Proxy VNFM 652 instantiates VNF(s) 957 at its PoPs 645 may be achieved through internal signalling within the NFV-MANO 610 of TCSP A 150. Similarly, the procedure whereby the Orchestrator 611 instructs the VIM 613 to allocated resources and the VNFM 612 instantiates VNF(s) 967 at its PoPs 645 may be achieved through internal signalling within the NVF-MANO 610 of TCSP C 155.

When the VNF(s) 967 have been instantiated, report(s) 1020 are sent by the VNF(s) 967 back to the VNFM 612 of TCSP C 155. When the VNF(s) 657 have been instantiated, report(s) 1021 are sent by the VNF(s) 657 back to the Proxy VNFM 652 of TCSP A 150.

When such reports 1019 are received, VNFM 612 of TCSP C 155 forwards them 1022 to the Network Manager 651 of TCSP C 155. When such reports 1020 are received, Proxy VNFM 652 of TCSP A 150 forwards 1023 them to the Network manager 651 of TCSP A 150.

Once the VNF(s) 657, 967 are fully active, the individual TCSPs 150, 155 can access and manage their respective VNF(s) 657, 967 through the Proxy VNFM 652 and the VNFM 612 respectively.

Thus, for hard resource slicing, each TCSP 150, 155 can manage its own VNF(s) 657, 957, 967. For soft resource slicing, contention for infrastructure 145, 945 may be resolved through a new round of resource negotiations by the Negotiator 655 of TCSP A 150, sharing the resource(s) 145 in collaboration with the Broker entity 935 of TCSP C 155. Such negotiations could be distributive or iterative in nature.

Figure 11:
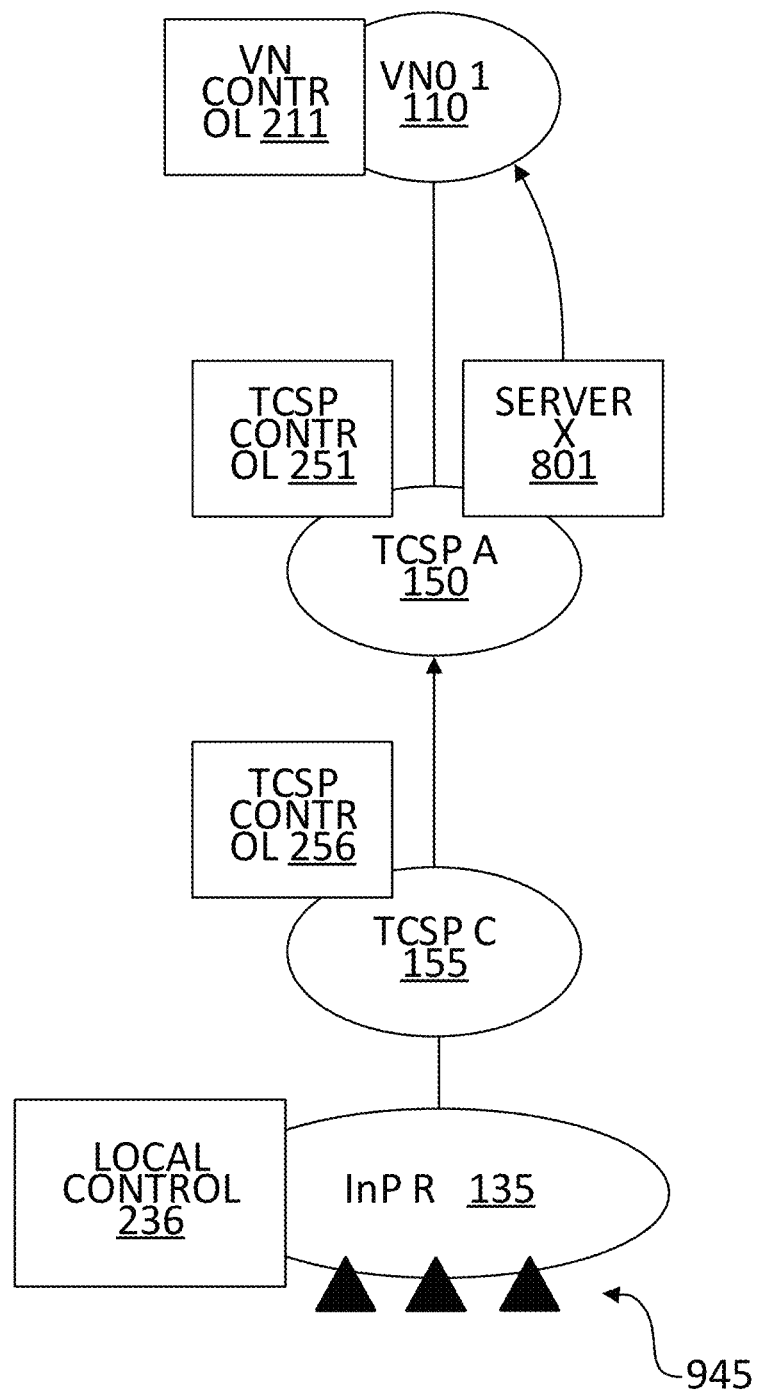
FIG. 11 is a block diagram of a fourth example class of scenarios in which connectivity services from one TCSP is shared with another TCSP according to an example of the present disclosure.

FIG. 11 is a schematic view of a fourth example class of scenarios in which infrastructure 945 of InP R 135 is shared among multiple TCSPs, in this case, TCSP A 150 and TCSP C 155. In such an example, and from the perspective of TCSP C 155, TCSP A 150 may act in a manner that emulates a VNO 110, 115. For example, TCSP A 150 may request a connectivity service from TCSP C 155. TCSP A 150 may be considered to be an upstream TCSP relative to TCSP C 155 and TCSP C 155 may be considered to be a downstream TCSP relative to TCSP A 150.

This scenario may occur, by way of non-limiting example, if TCSP A 150 desires to use a service, such as a connectivity service offered by TCSP C 155, for example, in order to provide guaranteed service to UE 2 222, as it accesses a server, for example Server X 801.

This scenario differs from the scenario described in FIG. 8, in that TCSP A 150 does not necessarily have knowledge of what infrastructure 945 is to be used by TCSP C 155 to provide the service. Rather, TCSP A 150 relies on a QoS guarantee that may, in some example embodiments, may be enshrined in a service level agreement (SLA) that it has entered into with TCSP C 155.

TCSP C 155, via its NFV-MANO 610, is able to provide a network connectivity service to TCSP A 150. The requested connectivity service may be for a given geographical area, with links, VMs and access service guarantees for a given area for the customer and end users of a virtual network operated by TCSP A 150.

In accordance with such QoS guarantee, TCSP C 155 is tasked with establishing RC, AAA and/or AC mechanisms and/or performance monitoring in order to uphold its obligations under such SLA.

In some cases, if TCSP A 150 determines that it is likely that other users might also roam to the area covered by the infrastructure 945 of TCSP C 155 while still remaining affiliated with TCSP A 150, TCSP A 150 may request an enhanced SLA from TCSP C 155 to cover such predicted behaviour.

From the perspective of TCSP C 155, TCSP A 150 acts as a VNO. Thus, the TCSP control element 951 (and the TCSP monitor (not shown)) of TCSP C 155 may be considered to be a downstream control element to the TCSP control element 251 (and the TCSP monitor 252) of TCSP A 150 and conversely, the TCSP control element 251 (and the TCSP monitor 252) of TCSP A 150 may be considered to be an upstream control element to the TCSP control element 951 (and the TCSP monitor (not shown) of TCSP C 155.

Nevertheless, TCSP C 155 remains a completely "closed network" in that it does not disclose its network details. Rather, it merely provides coverage details and input and output nodes, links and the like. Placement of VNFs is decided by TCSP C 155 after a request is received from TCSP A 150 for connectivity.

Method Actions

Figure 12:
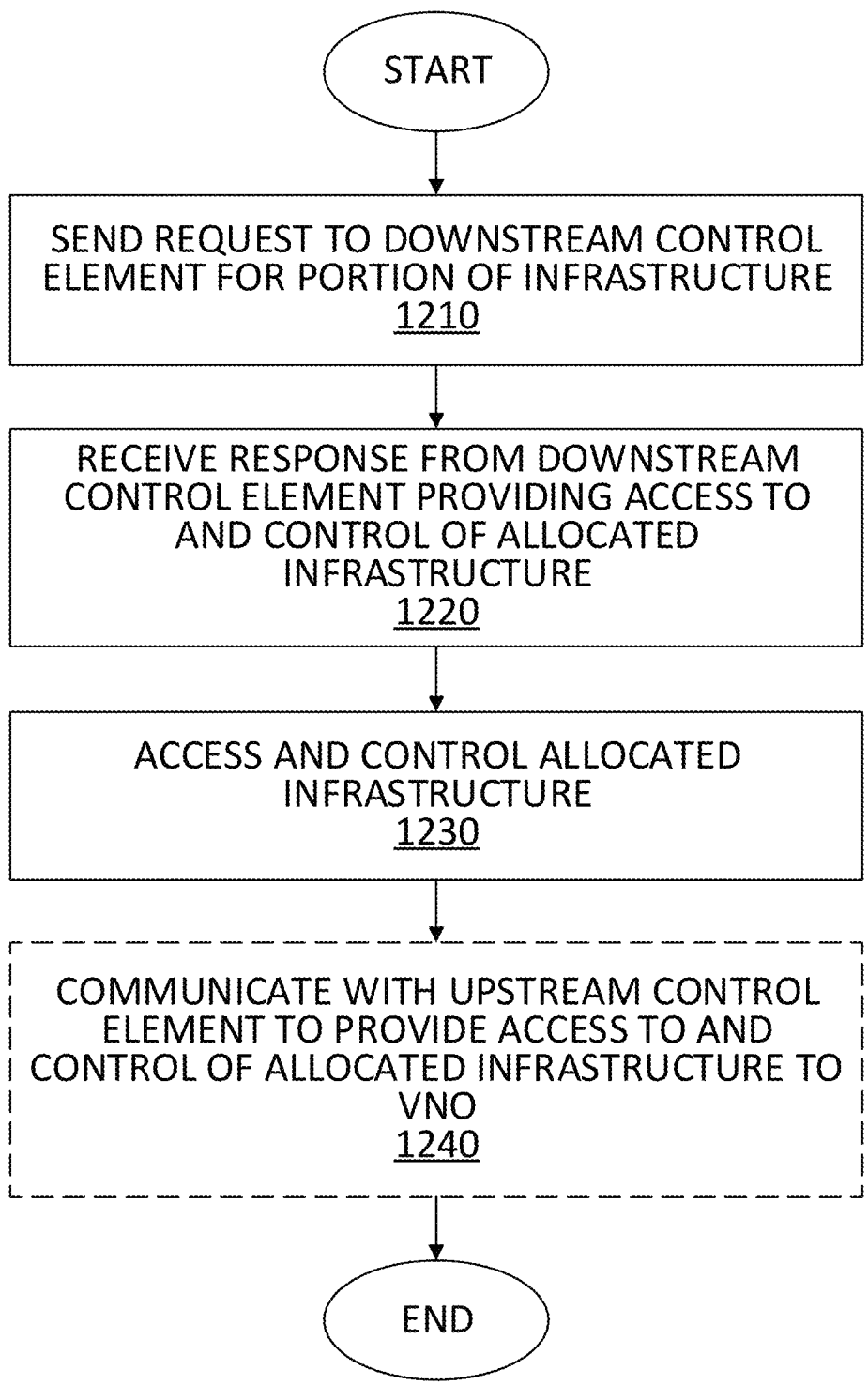
FIG. 12 is a flow chart showing example actions taken by a TCSP for allocating at least one infrastructure resource to at least one VNO according to an example of the present disclosure.

Turning now to FIG. 12, there is shown a flow chart, shown generally at 1500, showing example actions taken by a processor at a TCSP 150, 155, 160 to allocate at least one infrastructure resource 140, 145 to at least one VNO 110, 115.

One example action 1210 is to send a request to the downstream control element for a portion of the infrastructure 140, 145 to be allocated to the TCSP 150, 155, 160 by an InP 130, 135 associated with the infrastructure 140, 145.

One example action 1220 is receive a response from the downstream control element providing access to and control of the allocated infrastructure to the TCSP 150, 155, 160.

One example action 1230 is access and control the allocated infrastructure 140, 145.

In some examples, one example action 1240 is to communicate with an upstream control element for providing access to and control of the allocated infrastructure to the VNO 110, 115.

Example Device

Having described in detail example embodiments that are in accordance with the present disclosure, it is noted that the embodiments reside primarily in combinations of apparatus or devices and processing actions related to interactions between one or more of such components.

Figure 13:
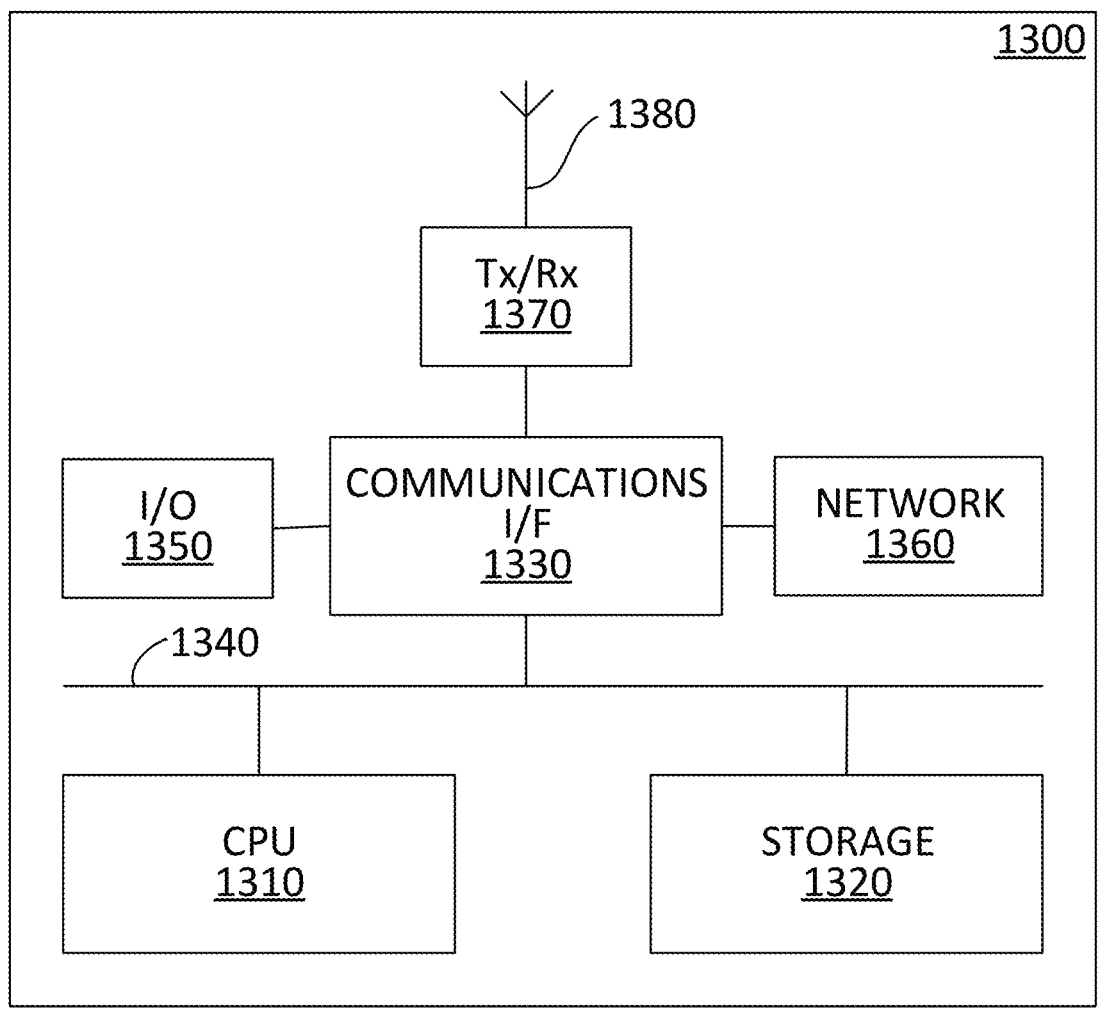
FIG. 13 is a block diagram of a processing system according to an example of the present disclosure.

FIG. 13 is a block diagram of a processing system that may be used for implementing one or more devices, shown generally at 1400, such as the InP 110, 115, the TCSP 150, 155, 160 and/or the InP 130, 135 disclosed herein and for performing actions in one or more of the methods disclosed herein.

The device 1300 comprises a processing unit 1310, a storage medium 1320 and a communications interface 1330. In some example embodiments, the device 1300 may also comprise a processing bus 1340 interconnecting some or all of these components, as well as other devices and/or controllers. In some example embodiments, the device 1300 may comprise an input/output (I/O) device 1350, a network connectivity device 1360, a transceiver 1370 and/or an antenna 1380.

The processing unit 1310 controls the general operation of the device 1300, by way of non-limiting example, by sending data and/or control signals to the communications interface 1330, and by retrieving data and/or instructions from the storage medium 1320 to execute method actions disclosed herein.

However configured, the hardware of the processing unit 1310 is configured so as to be capable of operating with sufficient software, processing power, memory resources and network throughput capability to handle any workload placed upon it.

The storage medium 1320 provides storage of data used by the device 1300, as described above.

The storage medium 1320 may also be configured to store computer codes and/or code sequences, instructions, configuration information, data and/or scripts in a computer program residing on or in a computer program product that, when executed by the processing unit 1310, causes the processing unit 1310 to perform one or more functions associated with the device 1300, as disclosed herein.

The communications interface 1330 facilitates communication with the I/O device(s) 1350, network connectivity device(s) 1360 and/or other entities in a communications network. In some example embodiments, the communications interface 1330 is for connection to a transceiver 1370, which may comprise one or more transmitters and/or receivers, and at least one antenna 1380, through which such communications are effected. As such, the communications interface 1330 may comprise one or more interfaces and a suitable number of ports, to couple internal and external I/O devices 1350, network connectivity devices and the like to the processing unit 1310.

Network connectivity devices 1360 may enable the processing unit 1310 to communicate with the internet or one or more intranets (not shown) to communicate with remote devices, for data processing and/or communications. The network connectivity devices 1360 may also comprise and/or interface with one or more transceivers 1370 for wirelessly or otherwise transmitting and receiving signals. With such a network connection, it is contemplated that the processing unit 1310 may receive information from the network or might output information to the network in the course of performing one or more of the above-described method actions.

The transceiver 1370 operates to prepare data to be transmitted and/or to convert received data for processing by the processing unit 1310.

Other components, as well as related functionality of the device 1300, may have been omitted in order not to obscure the concepts presented herein.

Figure 14:
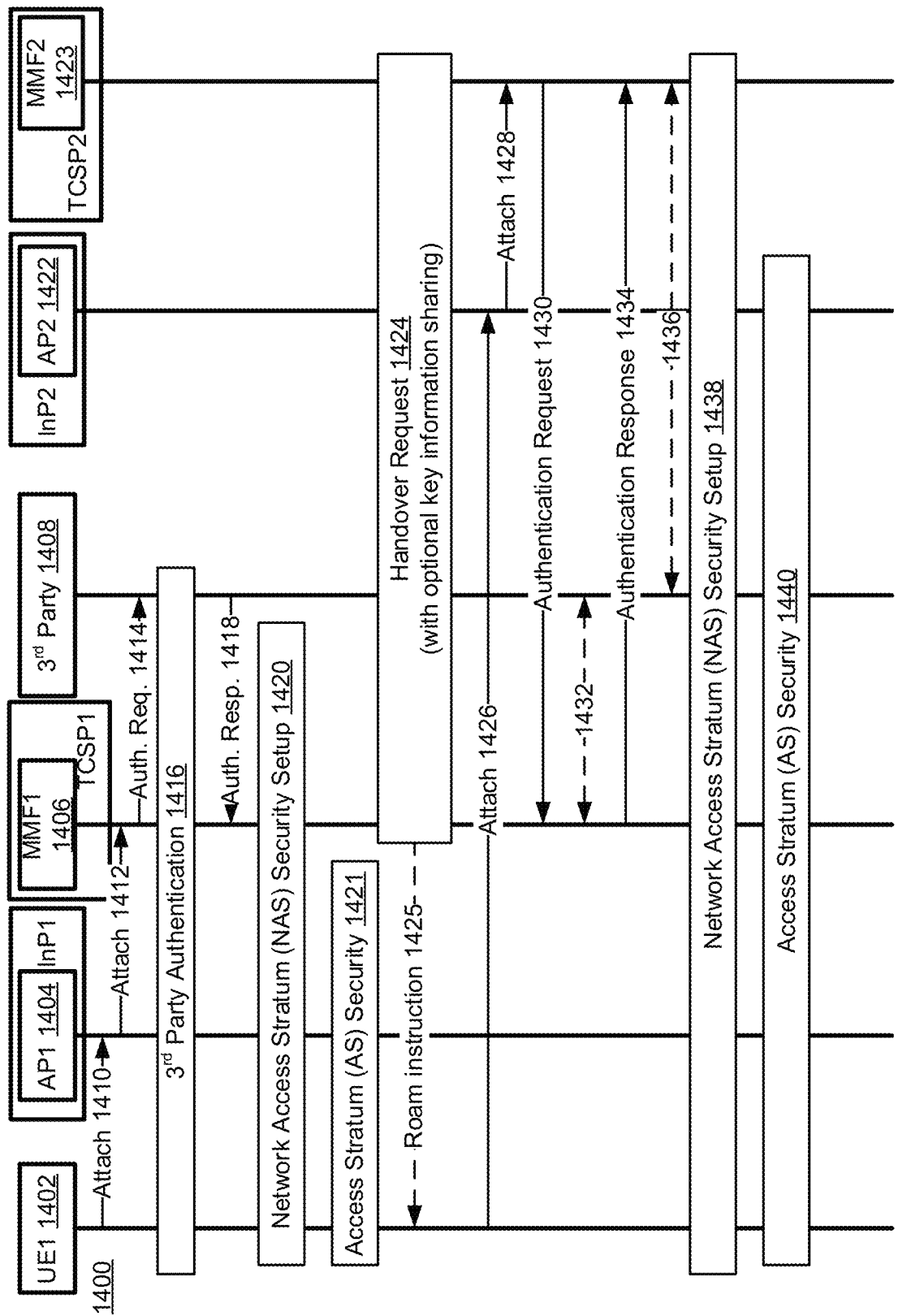
FIG. 14 is a call flow illustrating a method of authenticating a user or user equipment in a roaming scenario.

FIG. 14 is a call flow diagram illustrating the interaction of two TCSPs to allow roaming. As noted above, for example, with respect to FIGS. 8 and 11, TCSPs can interact with each other with one acting as either an InP or a VNO. This allows a UE associated with a VNO to connect to an access point in an InP that is associated with a TCSP that is not associated with the VNO. Through a TCSP-to-TCSP interaction, the UE can effectively roam on a visited network, while still getting many of the services and processing that would be present on a home network.

It will be understood that the requirement to authenticate a UE could vary between VNOs, and even between TCSPs. With this variability, it may be possible to replace UE authentication with user authentication. This authentication could be provided by a third party authentication service. There may be no requirement for different VNOs and TCSPs to support third party authentication or even if they do, there is no guarantee that each VNO or TCSP would support the same 3$^{rd}$ party authentication services. This will create a problem for roaming, as a UE may try to attach to a network that does not support the same authentication that its home network does.

FIG. 14 is a call flow 1400 illustrating a mechanism for third party authentication, and also for supporting 3$^{rd}$ party authentication in a roaming environment. The UE 1402 sends an attach request 1410 to an AP1 1404 that is connected to a TCSP that supports its VNO. AP1 1404 forwards attach request 1412 to the Mobility Management Function (MMF) 1406 in the TCSP associated with the UE's VNO. MMF1 1406 determines, based on the received attach request, that a 3$^{rd}$ party authentication service 1408 is to be used for the authentication. An Authentication request 1414 is sent to the 3$^{rd}$ party 1408. The 3$^{rd}$ party authentication service 1408 creates a session with UE1 1402 and performs the third party authentication 1416. As noted above, this could be UE authentication or user authentication (or both). Upon successful authentication, 3$^{rd}$ party 1408 sends an authentication response 1418 to MMF1 1406. At this point, the TCSP based MMF knows that the session has been authenticated. A Network Access Stratum (NAS) Security Setup 1420 can then occur, followed by an Access Stratum (AS) Security setup 1421. As the NAS 1420 and AS1421 processes are performed, the attach response is propagated towards UE1 1402. Those skilled in the art will appreciate that other security processes could be used but NAS and AS have been illustrated to maintain as much compatibility with 3GPP LTE standards as possible.

As UE1 1402 moves towards the edge of the geographic region supported by any of the InPs associated with TCSP1, the MMF 1406 can identify another TCSP, TCSP2, which UE1 1402 should be served by. A handover procedure 1424 can occur between MMF1 1406 and MMF2 1423 and may optionally include key sharing. MMF1 1406 can optionally send roaming instructions 1425 UE1 1402. The roaming instructions can provide UE1 1402 with information that can be used during the attach process to have the service routed through TCSP2. UE1 1402 sends an attach request 1426 to AP2 1422, which forwards attach request 1428 to MMF2 1423. UE1 1402 cannot be authenticated by MMF2 1423 using 3$^{rd}$ party 1408. This may be due to MMF2 1423 not supporting 3$^{rd}$ party authentication, or it may be due to MMF2 1423 not supporting 3$^{rd}$ party 1408 in particular. Because UE1 1402 is roaming, and because it previously had a session with MMF1 1406, MMf2 1423 can send authentication request 1430 to MMF1 1406. MMF1 may optionally request 1432 authentication credentials to be sent to MMF2 1423. An Authentication Response 1434 is sent to MMF2 1423. MMF2 1423 may optionally use information from the Authentication Response 1434 to identify 3$^{rd}$ party 1408 and then connect in session 1436. After either 1432 or 1436, 3$^{rd}$ Party 1408 may optionally repeat authentication 1416. At this point, MMF2 1423 has authenticated either UE1 1402 or the user. NAS security setup 1438 and AS security setup 1440 can then be undertaken.

Terminology

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether electrically, mechanically, chemically, or otherwise.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric center of the device, area or volume or designated parts thereof. Moreover, all dimensions described herein are intended solely to be by way of example for purposes of illustrating certain embodiments and are not intended to limit the scope of the disclosure to any embodiments that may depart from such dimensions as may be specified.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

General

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that the present disclosure, which can be modified by omitting, adding or replacing elements with equivalent functional elements, provides many applicable inventive concepts that may be embodied in a wide variety of specific contexts. The specific embodiments discussed are merely illustrative of specific ways to make and use the disclosure, and do not limit the scope of the present disclosure. Rather, the general principles set forth herein are considered to be merely illustrative of the scope of the present disclosure.

It will be apparent that various modifications and variations covering alternatives, modifications and equivalents will be apparent to persons having ordinary skill in the relevant art upon reference to this description and may be made to the embodiments disclosed herein, without departing from the present disclosure, as defined by the appended claims.

Accordingly the specification and the embodiments disclosed therein are to be considered examples only, with a true scope of the disclosure being disclosed by the following numbered claims:

What is claimed is:

1. A method of supporting third party authentication of a user equipment (UE) at a function located at a radio access point, the method comprising:
   receiving an attach request associated with a UE at the function located at the radio access point, the radio access point being directly coupled to the UE via wireless communication;
   determining that the UE associated with the attach request cannot be authenticated using resources that are local to the radio access point, wherein the resources that are local to the radio access point implement an authentication function of an infrastructure provider exercising limited control over UE authentication;
   upon determining that the UE cannot be authenticated using said resources that are local to the radio access point, transmitting an authentication request to an upstream second function to obtain authentication of the UE, the upstream second function being located in a core network operated by a telecommunications service provider (TCSP) and coupled to the radio access point;
   determining that the UE associated with the attach request cannot be authenticated using resources of the upstream second function;
   upon determining that the UE cannot be authenticated using said resources of the upstream second function, transmitting the authentication request to a third function to obtain authentication of the UE, the third function belonging to a third party authentication service, the third party being separate from the TCSP; and
   receiving from the third function a third-party authentication associated with the UE,
   wherein the function located at the radio access point is a local authentication, authorization, and accounting (AAA) function configured to support a network slice of a virtual network operator (VNO) served by the TCSP, the AAA function configured with a subset of AAA information and policy information for the VNO.

2. The method of claim 1, further comprises receiving a handover request from the upstream second function in advance of receipt of the attach request.

3. The method of claim 1, wherein the received third party authentication is an authentication of a user.

4. The method of claim 1, wherein the radio access point belongs to an infrastructure provider, and wherein the AAA function is operated by a network slice provider or the VNO to support the network slice offered by the network slice provider to the VNO, and wherein the network slice provider configures the policy information of the AAA function to enable the AAA function to authenticate an attach requests according to the policy information.

5. The method of claim 4, wherein the infrastructure provider provides a shared virtual infrastructure manager (VIM) usable by the network slice provider to access network resources, including the resources that are local to the radio access point, and wherein said accessing network resources comprises using the network resources to provide one or more virtual network functions.

6. The method of claim 5, wherein said accessing network resources comprises establishing a proxy virtual network function manager to manage the one or more virtual network functions in accordance with an agreement with the infrastructure provider.

7. The method of claim 1, wherein the upstream second function is another AAA function belonging to a network slice provider.

8. The method of claim 7, wherein the another AAA function is configured to request authentication from a further AAA function belonging to a VNO control element.

9. The method of claim 7, wherein the another AAA function is configured to request authentication from an external authentication entity different from all VNOs served by the network slice provider.

10. The method of claim 9, wherein the external authentication entity is another network slice provider associated with the VNO.

11. The method of claim 1, wherein the upstream second function performs authentication operations in accordance with further policy information, said further policy information being set according to a network slice agreement with the VNO.

12. The method of claim 1, wherein the upstream second function is a function controlled by the VNO.

13. The method of claim 1, further comprising, upon determining that the UE can be authenticated using said resources that are local to the radio access point, requesting providing of services to the UE using the VNO, and wherein determining that the UE can be authenticated using said resources that are local to the radio access point comprises performing an authentication process using said resources that are local to the radio access point.

14. The method of claim 1, wherein said determining that the UE cannot be authenticated using said resources of the second function is based on an indication, included in the attach request, that the third function is to be used for authentication.

15. The method of claim 1, wherein the resources that are local to the radio access point comprise resources residing within the radio access point, and wherein the third party is outside of network resources associated with the network slice.

16. The method of claim 1, wherein the third function creates a session with the UE for performing the third party authentication, wherein the third party authentication is an authentication of the UE, an authentication of a user associated with the UE, or a combination thereof.

17. The method of claim 1, wherein the upstream second function has a larger region of control than the resources that are local to the radio access point.

18. The method of claim 1, wherein third party is also separate from both the infrastructure provider and the VNO.

19. The method of claim 1, wherein the upstream second function is instantiated by an orchestrator function, the orchestrator function configured to identify suitable point of presence entities for virtual network functions including the upstream second function.

20. An apparatus for supporting third party authentication of a user equipment (UE) at a function located at a radio access point, the apparatus comprising a processor, a non-transitory memory and a network interface and configured to:
receive an attach request associated with a UE at the function located at the radio access point, the radio access point being directly coupled to the UE via wireless communication;
determine that the UE associated with the attach request cannot be authenticated using resources that are local to the radio access point, wherein the resources that are local to the radio access point implement an authentication function of an infrastructure provider exercising limited control over UE authentication;
upon determining that the UE cannot be authenticated using said resources that are local to the radio access point, transmit an authentication request to an upstream second function to obtain authentication of the UE, the upstream second function being located in a core network operated by a telecommunications service provider (TCSP) and coupled to the radio access point;
receive from the upstream second function an authentication associated with the UE, or receive, from a third function belonging to a third party authentication service which is separate from the TCSP, a third party authentication associated with the UE,
wherein the function located at the radio access point is a local authentication, authorization, and accounting (AAA) function configured to support a network slice of a virtual network operator (VNO) served by the TCSP, the AAA function configured with a subset of AAA information and policy information for the VNO.

21. The apparatus of claim 20, further configured to receive a handover request from the upstream second function in advance of receipt of the attach request.

22. The apparatus of claim 20, wherein the received third party authentication is an authentication of a user.

23. The apparatus of claim 20, wherein the radio access point belongs to an infrastructure provider, and wherein the AAA function is operated by a network slice provider to support the network slice offered by the network slice provider to the VNO.

24. The apparatus of claim 20, wherein the upstream second function is another AAA function belonging to a network slice provider or a function controlled by the VNO.

25. The apparatus of claim 20, wherein the upstream second function performs authentication operations in accordance with further policy information, said further policy information being set according to a network slice agreement with the VNO.

26. A system comprising:
a first apparatus for supporting third party authentication of a user equipment (UE) at a first function located at a radio access point, the first apparatus configured to:
receive an attach request associated with a UE at the first function located at the radio access point, the radio access point being directly coupled to the UE via wireless communication;
determine that the UE associated with the attach request cannot be authenticated using resources that are local to the radio access point, wherein the resources that are local to the radio access point implement an authentication function of an infrastructure provider exercising limited control over UE authentication;
upon determining that the UE cannot be authenticated using said resources that are local to the radio access point, transmit an authentication request to a second function to obtain authentication of the UE; and
receive from the second function an authentication associated with the UE, or receive from a third function a third party authentication associated with the UE,
wherein the first function located at the radio access point is a local authentication, authorization, and accounting (AAA) function configured to support a network slice of a virtual network operator (VNO), the AAA function configured with a subset of AAA information and policy information for the VNO; and
a second apparatus located in a core network operated by a telecommunications service provider (TCSP) and coupled to the radio access point, the second apparatus configured to:
implement the second function, the second function receiving the authentication request from the first function and determining whether or not the UE can be authenticated using resources of the second function, the second function further transmitting the authentication to the first function in response to determining that the UE can be authenticated using resources of the second function, and the second function further transmitting the authentication request to the third function in response to determining that the UE cannot be authenticated using resources of the second function;
a third apparatus configured to implement the third function, the third function belonging to a third party authentication service separate from the TCSP,
the third function configured, in response to receiving the authentication request, to transmit the authentication to the first function in response to determining that the UE can be authenticated.

27. The system of claim 26, wherein determining that the UE cannot be authenticated using said resources of the second function is based on an indication, included in the attach request, that the third function is to be used for authentication.

* * * * *